US011696127B2

(12) United States Patent
Stattin et al.

(10) Patent No.: US 11,696,127 B2
(45) Date of Patent: Jul. 4, 2023

(54) REPLAY PROTECTION FOR RESUME PROCEDURE

(71) Applicant: TELEFONAKTIEBOLAGET LM ERICSSON (PUBL), Stockholm (SE)

(72) Inventors: Magnus Stattin, Upplands Väsby (SE); Gunnar Mildh, Sollentuna (SE); Dung Pham Van, Upplands Väsby (SE); Paul Schliwa-Bertling, Ljungsbro (SE); Icaro L. J. Da Silva, Solna (SE); Karl Norrman, Stockholm (SE); Oscar Ohlsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 294 days.

(21) Appl. No.: 16/764,516

(22) PCT Filed: Nov. 16, 2018

(86) PCT No.: PCT/IB2018/059022
§ 371 (c)(1),
(2) Date: May 15, 2020

(87) PCT Pub. No.: WO2019/097458
PCT Pub. Date: May 23, 2019

(65) Prior Publication Data
US 2021/0235265 A1 Jul. 29, 2021

Related U.S. Application Data

(60) Provisional application No. 62/587,326, filed on Nov. 16, 2017.

(51) Int. Cl.
*H04W 12/06* (2021.01)
*H04W 76/27* (2018.01)
*H04W 12/106* (2021.01)

(52) U.S. Cl.
CPC ......... *H04W 12/06* (2013.01); *H04W 12/106* (2021.01); *H04W 76/27* (2018.02)

(58) Field of Classification Search
CPC ... H04W 12/06; H04W 12/106; H04W 76/27; H04W 12/041; H04W 76/18; H04W 76/19; H04L 63/068
See application file for complete search history.

(56) References Cited

U.S. PATENT DOCUMENTS 9,119,208 B2 * 8/2015 Dwyer ................. H04W 76/27
2007/0249352 A1 * 10/2007 Song ................. H04W 12/0431
455/436

(Continued)

FOREIGN PATENT DOCUMENTS

CN 102986258 B * 8/2016 ........ H04W 12/0017
WO WO-9962037 A1 * 12/1999 ............. G06Q 20/04
WO WO-2012031507 A1 * 3/2012 ........ H04W 36/0005

OTHER PUBLICATIONS

3rd Generation Partnership Project;Technical Specification Group Services and System Aspects; 3GPP System Architecture Evolution (SAE); Security architecture. 3GPP TS 33.401 V15.1.0 (Sep. 2017) (Year: 2017).*

(Continued)

Primary Examiner — Kristine L Kincaid
Assistant Examiner — Lydia L Noel
(74) Attorney, Agent, or Firm — Sage Patent Group

(57) ABSTRACT

A communication system for resuming a connection comprises a user equipment (UE) and network nodes. A first network node is configured to prepopulate a UE context, and send, to a second network node, the UE context. The second network node is configured to receive, from the first network node, the UE context, and send, to a UE, a resume request message including a freshness parameter and the UE context. The UE is configured to receive, from the second (Continued)

network node, a resume request message including the freshness parameter and the UE context, generate an authentication token based on the freshness parameter and the UE context, and send, to the second network node, a resume response message including the authentication token. The communication system provides a freshness parameter and a prepopulated UE context to secure and facilitate resume procedure against replay attacks.

20 Claims, 20 Drawing Sheets

(56) References Cited

U.S. PATENT DOCUMENTS

| | | | |
|---|---|---|---|
| 2019/0029066 A1* | 1/2019 | Xu | H04W 76/10 |
| 2019/0059128 A1* | 2/2019 | Gage | H04L 9/088 |
| 2020/0022044 A1* | 1/2020 | Kim | H04W 36/02 |
| 2020/0214070 A1* | 7/2020 | Ingale | H04W 74/0833 |

OTHER PUBLICATIONS

3rd Generation Partnership Project; Technical Specification Group Services and System Aspects; 3GPP System Architecture Evolution (SAE); Security architecture (Release 15), 3GPP TS 33.401 V15.1.0 (Sep. 2017).

Ericsson, Security for RRC Connection Suspend and Resume, S3-160588 (revision of S3-16abcd), 3GPP TSG-SA WG3 Meeting #83, San Jose Del Cabo, Mexico, May 9-13, 2016.

Ericsson, Handling of inactive UEs, Tdoc R2-163998, 3GPP TSG-RAN WG2 #94, Nanjing, P.R. China, May 23-27, 2016.

Ericsson, Security aspects of NB-IoT, Tdoc R2-162866, 3GPP TSG-RAN WG2 #93bis, Dubrovnik, Croatia, Apr. 11-15, 2016.

Ericsson, Early Data Transmission over NAS, R2-1710521, 3GPP TSG-RAN WG2 #99bis, Prague, Czech Republic, Oct. 9-13, 2017.

* cited by examiner

REPLAY PROTECTION FOR RESUME PROCEDURE

This application is a 371 of International Application No. PCT/IB2018/059022, filed Nov. 16, 2018, which claims the benefit of U.S. Application No. 62/587,326, filed Nov. 16, 2017, the disclosures of which are fully incorporated herein by reference.

TECHNICAL FIELD

Particular embodiments relate to the field of resuming connection for a user equipment; and more specifically, to methods, apparatus and systems for resuming a connection state for the user equipment in the 5G generation radio.

BACKGROUND

Long Term Evolution (4G), category M1 (LTE-M) and Narrowband IoT (NB-IoT) are two Low Power Wide Area (LPWA) technologies developed for IoT applications. A fundamental principle of LTE operation is for the user equipment (UE) to signal as little as possible while not having any data to send or receive, which means to use as little power as possible. In order to have the UE use the minimum power, the UE remains in RRC_IDLE while not sending any data. Before each transmission, the UE needs to switch state from RRC_IDLE to RRC_CONNECTED which requires a procedure that involves exchanging a number of messages between the UE and the eNB. Remaining in RRC_IDLE is especially efficient for this purpose as long as the UE remains fairly stationery, i.e. does not have to perform measurements on other neighboring cells. Hence, a fast switch to RRC_IDLE is particularly efficient for machine type communication (MTC) devices.

To further reduce power consumption, the UE can reduce the amount of signaling needed to execute the state transition from RRC_IDLE to RRC_CONNECTED. One such solution is RRC connection suspend and resume solution which was introduced in Release 13. The RRC connection suspend and resume solution for User Plane (UP)-based data transfer reduces the signaling overhead required for UE state transition from the IDLE to CONNECTED, in order to have a user plane transaction with the network and back to IDLE state on the radio interface from 10 down to 5 messages.

The signaling overhead reduction is realized by introducing two procedures "RRC connection suspend" and "RRC connection resume" that are described below and the introduction of a modified UE behavior in RRC_IDLE where relevant AS information is stored at transition to RRC_IDLE. Storing of parameters is triggered by a RRC connection suspend procedure, and parameters are reused by the UE for a subsequent connection setup.

FIG. 1 illustrates an example legacy connection set up in S1/EPS architecture-based procedures required to establish and tear down a connection in order for the UE to be able to transfer/receive user plane, i.e. procedures applicable at UE IDLE/Connected state transition. As the main contributors to the signaling overhead being S1/EPS architecture-based procedures required for UE state transition, a significant signaling overhead may be found on the radio-Uu, S1-AP interface. In order to reduce the signaling overhead and the associated processing load in the network, a solution is introduced in Release 13 that allows an RRC Connection to be suspended and at a later time resumed. In this way, it minimizes the need to go through the full signaling procedure for IDLE to CONNECTED state transition.

The UE needs to perform an initial connection setup to establish the NAS signaling connection and provide the UE and network with an initial AS context, as shown in FIG. 1. The NAS layer is aware that subsequently no Service Requests are required as long as a valid AS context in the network is found by the AS layer. If for any reason the AS layer context is missing in the network while the UE attempts a resume procedure, the resume procedure fails and the AS layer triggers a NAS Layer Service Request to establish a new initial AS layer context.

RRC connection suspend and resume procedures are described in 3GPP TS 36.300 v14.2.0 as Table 1 below.

TABLE 1

| RRC connection suspend and resume procedures |
| --- |
| User Plane CIoT EPS optimizations |

The RRC connection established for User Plane CIoT EPS optimization, as defined in TS 24.301 [20], is characterized as below A RRC connection suspend procedure is used at RRC connection release, the eNB may request the UE to retain the UE AS context including UE capability in RRC_IDLE;
A RRC connection resume procedure is used at transition from RRC_IDLE to RRC_CONNECTED where previously stored information in the UE as well as in the eNB is utilised to resume the RRC connection. In the message to resume, the UE provides a Resume ID to be used by the eNB to access the stored information required to resume the RRC connection;
At suspend-resume, security is continued. Re-keying is not supported in RRC connection resume procedure. The short MAC-I is reused as the authentication token at RRC connection reestablishment procedure and RRC connection resume procedure by the UE. The eNB provides the NCC in the RRCConnectionResume message as well. And also the UE resets the COUNT;
Multiplexing of CCCH and DTCH in the transition from RRC_IDLE to RRC CONNECTED is not supported;
For NB-IoT, a non-anchor carrier can be configured when an RRC connection is re-established, resumed or reconfigured additionally when an RRC connection is established.

FIGS. 2 and 3 illustrate an example RRC connection suspend and resume procedures respectively. Note that the description here is only intended as an overview and all parameters are therefore not listed in the message flows.

FIG. 2 illustrates an example RRC connection suspend procedure in an LTE system. RRC Connection Suspend procedure may comprise the following steps: 1. Due to some triggers, e.g. the expiry of a UE inactivity timer, the eNB decides to suspend the RRC connection; 2. The eNB initiates the S1-AP UE Context Suspend procedure to inform the MME that the RRC connection is being suspended; 3. The MME requests the S-GW to release all S1-U bearers for the UE; 4. MME acknowledges step 2; and 5. The eNB suspends the RRC connection by sending an RRCConnectionRelease message with the releaseCause set to rrc-Suspend. The message includes the Resume ID which is stored by the UE; 6. The UE stores the AS context, suspends all SRBs and DRBs, and enters RRC_IDLE.

FIG. 3 illustrates an example RRC Connection Resume procedure in an LTE system. The RRC Connection Resume procedure may comprise the following steps: 1. At some later point in time, e.g. when the UE is being paged or when new data arrives in the uplink buffer, the UE resumes the connection by sending an RRCConnectionResumeRequest to the eNB. The UE includes its Resume ID, the establishment cause, and authentication token. The authentication token is calculated in the same way as the short MAC-I used in RRC connection re-establishment and allows the eNB to verify the UE identity; 2. Provided that the Resume ID exists and the authentication token is successfully validated, the eNB responds with an RRCConnectionResume. The message includes the Next Hop Chaining Count (NCC) value which is required in order to re-establish the AS security; 3. The UE resumes all SRBs and DRBs and re-establishes the AS security. The UE is now in RRC_CONNECTED; 4. The UE responds with an RRCConnectionResumeComplete confirming that the RRC connection was resumed successfully; 5. The eNB initiates the S1-AP Context Resume procedure to notify the MME about the UE state change; 6. The MME requests the S-GW to activate the S1-U bearers for the UE; and 7. MME acknowledges step 5.

FIG. 4 illustrates an RRC Connection Resume procedure in different eNBs. An RRC connection can also be resumed in a new eNB, which is different from the old eNB where the connection was suspended. Inter eNB connection resumption is handled using context fetching, whereby the new eNB retrieves the UE context from the old eNB over the X2 interface. The new eNB provides the Resume ID which is used by the old eNB to identify the UE context. The detailed steps comprise: 1. Same as step 1 in the intra eNB connection resumption disclosed in FIG. 3; 2. The new eNB locates the old eNB using the Resume ID and retrieves the UE context by means of the X2-AP Retrieve UE Context procedure; 3. The old eNB responds with the UE context associated with the Resume ID; 4. Same as step 2 in the intra eNB connection resumption disclosed in FIG. 3; 5. Same as step 3 in the intra eNB connection resumption disclosed in FIG. 3; 6. Same as step 4 in the intra eNB connection resumption disclosed in FIG. 3; 7. The new eNB initiates the S1-AP Path Switch procedure to establish a S1-UE-associated signaling connection to the serving MME and to request the MME to resume the UE context; 8. The MME requests the S-GW to activate the S1-UE bearers for the UE and updates the downlink path. 9. MME acknowledges step 7; and 10. After the S1-AP Path Switch procedure, the new eNB triggers release of the UE context at the old eNB by means of the X2-AP UE Context Release procedure.

Furthermore, in case the resume attempt/request needs to be rejected by the network, the UE can be directed to keep its connection suspended, i.e., return to RRC_IDLE with suspended RRC connection still. In LTE and NB-IoT system, this is done with an RRCConnectionReject message with suspend indication from the eNB to the UE.

The content of the RRCConnectionRequest message is specified in 3GPP TS 36.331 v14.2.0 as Tables 2 and 3 below.

TABLE 2

| RRCConnectionRequest message |
|---|
| -- ASN1START |
| RRCConnectionRequest ::=           SEQUENCE { |
|   criticalExtensions                CHOICE { |
|     rrcConnectionRequest-r8            RRCConnectionRequest-r8-IEs, |
|     criticalExtensionsFuture           SEQUENCE { } |
|   } |
| } |
| RRCConnectionRequest-r8-IEs ::=   SEQUENCE { |
|   ue-Identity                       InitialUE-Identity, |
|   establishmentCause                EstablishmentCause, |
|   spare                             BIT STRING (SIZE (1)) |
| } |
| InitialUE-Identity : : =            CHOICE { |
|   s-TMSI                            S-TMSI, |
|   randomValue                       BIT STRING (SIZE (40) ) |
| } |
| EstablishmentCause ::=              ENUMERATED { |
|                                       emergency, highPriorityAccess, mt-Access, mo-Signalling, |
|                                       mo-Data, delayTolerantAccess-v1020, mo-VoiceCall-v1280, spare1} |
| -- ASN1STOP |

TABLE 3

| RRCConnectionResumeRequest field descriptions |
|---|
| RRCConnectionResumeRequest field descriptions |
| resumeCause |
| Provides the resume cause for the RRC connection resume request as provided by the upper layers. |
| resumeIdentity |
| UE identity to facilitate UE context retrieval at eNB |
| shortResumeMAC-I |
| Authentication token to facilitate UE authentication at eNB |

As specified in 3GPP TS 36.331 v 14.2.1, the UE variable VarShortResumeMAC-Input specifies the input, which is used to generate the shortResumeMAC-I during RRC Connection Resume procedure, as Table 4 below.

TABLE 4

| VarShortResumeMAC-Input UE variable |
|---|
| -- ASN1START |
| VarShortResumeMAC-Input-r13 : : =        SEQUENCE { |
|   cellIdentity-r13                        CellIdentity, |
|   physCellId-r13                          PhysCellId, |
|   c-RNTI-r13                              C-RNTI, |
|   resumeDiscriminator-r13                 BIT STRING(SIZE(1)) |
| } |
| -- ASN1STOP |

TABLE 5

| VarShortResumeMAC-Input field descriptions |
|---|
| VarShortResumeMAC-Input field descriptions |
| cellIdentity |
| Set to CellIdentity of the current cell. |
| C-RNTI |
| Set to C-RNTI that the UE had in the PCell it was connected to prior to suspension of the RRC connection. |
| physCellId |
| Set to the physical cell identity of the PCell the UE was connected to prior to suspension of the RRC connection.. |
| resumeDiscriminator |
| A constant that allows differentiation in the calculation of the |

TABLE 5-continued

VarShortResumeMAC-Input field descriptions
VarShortResumeMAC-Input field descriptions MAC-I for shortResumeMAC-I
The resumeDiscriminator is set to '1'

For early data transmission in 3GPP Release 15, new work items (WIs) for Even further enhanced MTC for LTE (LTE_eMTC4) and Further NB-IoT enhancements (NB_IO-Tenh2) target eMTC and NB-IoT enhancements, respectively. The new WIs for LTE_eMTC4 here is referred to as WI_eMTC, and the new WIs for NB_IOTenh2 here is referred as WI_NBIOT. In both of these, one of the goals for a WI is to reduce UE power consumption and latency through introducing possibilities to send data as early as possible during the Random Access (RA) procedure.

WI_eMTC supports early data transmission and evaluates power consumption, latency gain, and specifies necessary support for downlink (DL)/uplink (UL) data transmission on a dedicated resource during the RA procedure, e.g. after physical random access channel (PRACH) transmission and before the RRC connection setup is completed, at least in the RRC Suspend/Resume case.

WI_NBIOT evaluates power consumption, latency gain, and specifies necessary support for DL/UL data transmission on a dedicated resource during the RA procedure, after NPRACH transmission and before the RRC connection setup is completed.

During RAN2 #99, several contributions on early data transmission (EDT) were discussed, and one of the agreements is to support early UL data transmission in Msg3 for RRC Suspend/Resume solution. RRC Suspend/Resume solution may also be referred to as UP solution. The recent RAN2 #99-Bis progressed further with some of agreements related to early data in Msg3 for UP solution. For one UP solution, SRB0 is used to transmit the RRC message in Msg3. For another UP solution, CCCH (RRC message) and DTCH (UP data) is multiplexed in MAC in Msg3. For yet another UP solution, AS security is resumed before transmitting Msg3, and data transmitted in Msg3 is protected by AS security.

New Radio Access Technology (NR) has a similar state transition as the one in LTE and NB-IoT. In context of 5G specification effort 3GPP decided to introduce a new RRC Inactive state. The state has among others following properties: 1. UE Context stored in the RAN. This UE Context is used at subsequent RRC_INACTIVE to RRC_CONNECTED transition. The stored UE context may include information about UE security context, data radio bearers, connected slices, UE capabilities etc., and 2. RAN paging procedure, where the RAN node that the UE was last connected to pages the UE over an area consisting of one or more cells, supported by one or more RAN nodes.

FIG. 5 illustrates an example RRC connected to RRC inactive state transition. The UE Context can be stored in a RAN node serving the UE before/at the transition from RRC_CONNECTED to RRC_INACTIVE state. This procedure is as specified from a change request (CR) to 3GPP TS 23.502.

This procedure is used by the network to suspend the RRC connection and perform a RRC Connected to RRC Inactive state transition if the UE and the network support RRC Inactive state (see TS 38.300 [9] and TS 38.413 [10]). The steps of this procedure comprise 1. sending RRC message (Resume ID) from RAN to UE; and 2. sending N2 Notification (Inactive) from RAN to AMF.

In the step of sending RRC message from the RAN to a UE, the RAN initiates the transition to the RRC Inactive state, see TS 38.300 [9] providing the UE with its Resume ID. The UE remains in CM-CONNECTED state. The N2AP association as well as N3 user plane resources are kept established. Data related to the N2AP association, UE Context and N3 user plane resources, necessary to resume the connection is kept in the RAN.

In the step of sending N2 Notification from RAN to AMF, RAN notifies the AMF that the UE's RRC state is moved RRC Inactive state. The N2AP association as well as N3 user plane resources are kept established. Data related to the N2AP association, UE Context and N3 user plane resources is kept in the AMF. AMF state remains CM-CONNECTED.

In the step of sending RRC message from the RAN to a UE, the RAN provides the UE with a UE RAN identity referred to in the present disclosure as a Resume ID. This identifier is associated with the UE Context of that UE stored in RAN.

At a subsequent transition from RRC_INACTIVE to RRC_CONNECTED state, the UE presents the Resume ID to the RAN. The RAN uses the Resume ID to locate and access the UE Context stored in the step of sending RRC message from RAN to UE 1 shown in FIG. 5.

FIG. 6 illustrates an example RRC Inactive to RRC Connected state transition as specified from a CR to 3GPP TS 23.502. The Connection Resume procedure is used by the UE to resume the RRC connection and to perform RRC Inactive to RRC Connected state transition. This procedure may be used, if the UE and the network support RRC Inactive state (see TS 38.300 [9]) and the UE has stored the necessary information to conduct the Connection Resume procedure (see TS 38.413 [10]). Otherwise the Service Request procedure is used, see clause 4.2.3.2.

RRC Inactive to RRC Connected state transition may comprise the steps as follows: 1. Sending RRC message (Resume ID) from a UE to the RAN; 2. Conditionally, the RAN performing UE Context Retrieval; 3. Sending RRC message (Resume ID) from the RAN to a UE; and 4. Sending N2 Notification (Connected) from RAN to AMF.

In the step of sending RRC message from a UE to the RAN, the UE initiates the transition from RRC Inactive state to RRC Connected state, see TS 38.300 [9]. The UE provides its Resume ID needed by the RAN to access the UE's stored Context.

In the step of the RAN performing UE Context Retrieval, UE Context Retrieval is performed when the UE Context associated with the UE attempting to resume its connection is not locally available at the accessed RAN. The UE Context Retrieval procedure via radio access network is specified in TS 38.423 [11]. The UE Context Retrieval procedure via the core network is specified in sub-clause x.y.z and in TS 38.413 [10].

In the step of sending RRC message from the RAN to a UE, the RAN confirms to the UE that the UE has entered RRC Connected state.

In the step of sending N2 Notification from RAN to AMF, RAN notifies the AMF that the UE entered RRC Connected state.

As outlined in step 1 in FIG. 6, the RAN uses the Resume ID to locate and access the UE Context. Given a subsequent RRC_INACTIVE to RRC_CONNECTED transition attempted by the UE can occur at a different RAN than was serving the UE at previous RRC_CONNECTED to RRC_INACTIVE transition, the UE Context can be stored at a different RAN than the RAN node accessed by the UE. This is described in step 2 in FIG. 6. If the new RAN is different from the old RAN where the UE has entered RRC_INACTIVE state and thus where the UE Context is stored, there is a need to locate the old RAN to be able to retrieve the UE Context so that it can be accessed and used by the new RAN.

To enable the location of the Resume ID, the Resume ID contains an identifier allowing the new RAN to locate the old RAN.

FIG. 7 illustrates an example UE Context Retrieval procedure via the radio access network and/or via a 5G core network (CN). The UE Context Retrieval via the radio access network procedure is used, if the UE in RRC Inactive state requests to resume a connection toward a new serving RAN while the UE Context is stored at old serving RAN, and the UE Context can be retrieved from the old serving RAN node by means of Xn signaling only. This procedure comprises the steps of: 1. New serving RAN to old Serving RAN: Xn Context Retrieval procedure; 2. New Serving RAN to Serving AMF: N2 Paths Switch; 3. New Serving RAN to Old Serving RAN: Xn Context Release; and 4. Old Serving RAN to New Serving RAN: Forwarding of pending DL user data is performed.

In step 1 of the procedure, the new serving RAN node retrieves the UE Context by using the Xn Retrieve UE Context procedure. If the old serving RAN node is able to resolve the Resume ID, it provides UE Context data to the New Serving RAN node.

In step 2 of the procedure, new serving RAN performs the N2 Path Switch procedure towards the AMF.

In step 3 of the procedure, the new serving RAN node requests the old serving RAN node to release the UE Context. This message contains Downlink forwarding addresses for the user data buffered at the old serving RAN nodes.

Similar to LTE and NB-IoT, the network may in some circumstances need to reject/deny a resume attempt/request. There currently exists certain challenges. With existing solutions, it is not possible for a UE to successfully retry and/or for a network node to accept a resume request in the same cell. A repeated resume request in the same cell may be a replay by an attacker utilizing an earlier resume request which was previously legitimate. If a replay of a resume request is accepted, an attacker may get unauthorized access to information about a user and/or the user equipment (UE). Furthermore, the legitimate user and/or the legitimate UE may be denied from services.

In the context of early data transmission, where UL data is included in Msg3, an attacker may replay the resume request and send faked user data in Msg3. With existing solutions, it is not possible for the eNB to detect such attacks when processing Msg3. As a result, the eNB may forward the faked data to S-GW without knowing that the Msg3 was not received from a legitimate UE, until the Msg5 is received.

SUMMARY

To address the foregoing problems with existing solutions, disclosed are methods, a user equipment (UE), and network nodes for resuming connection with an improved security against attacks after a failed resume request. The present disclosure enables a secure retry for resuming from an RRC_INACTIVE or IDLE state to RRC_CONNECTED state in the same cell.

Several embodiments are elaborated in this disclosure. According to a first embodiment, a method for resuming a connection performed at a network node comprises receiving, from a first network node at a second network node, a user equipment (UE) context prepopulated by the first network node. The method additionally comprises sending, from the second network node to a UE, a resume request message including a freshness parameter and the UE context. The method further comprises receiving, from the UE at the second network node, a resume response message including an authentication token generated by the freshness parameter and the UE context.

In one embodiment, the method further comprises sending, from the second network node to the UE, a connection setup message including an omission indication which instructs the UE not to send a complete message when there is no data transmission after the resume response message.

In one embodiment, the freshness parameter is used to indicate early data transmission.

In one embodiment, the UE context comprises access stratum (AS) integrity key. In another embodiment, the AS integrity key is generated based on Next Hop Chaining Count (NCC) value.

In one embodiment, the freshness parameter is a temporary cell radio network temporary identifier (C-RNTI).

In one embodiment, the authentication token is shortResumeMAC-1.

According to a second embodiment, a method for resuming a connection performed at a user equipment comprises receiving, from a first network node at a UE, a resume request message including a freshness parameter and a UE context. The method additionally comprises generating, at the UE, an authentication token based on the freshness parameter and the UE context. The method further comprises sending, to the first network node, a resume response message including the authentication token.

In one embodiment, the method further comprises receiving, from the first network node at the UE, a connection setup message including an omission indication which instructs the UE not to send a complete message when there is no data transmission after the resume response message.

In one embodiment, the UE context is prepopulated by a second network node and sent from the second network node to the first network node.

According to another embodiment, a network node for resuming a connection comprises at least one processing circuitry, and at least one storage that stores processor-executable instructions, when executed by the processing circuitry, causes the network node to receive, from a first network node, a UE context prepopulated by the first network node; send, to a UE, a resume request message including a freshness parameter and the UE context; and receive, from the UE, a resume response message including an authentication token generated by the freshness parameter and the UE context.

According to another embodiment, a user equipment for resuming a connection comprises at least one processing circuitry, and at least one storage that stores processor-executable instructions, when executed by the processing circuitry, causes the user equipment to receive, from a first network node, a resume request message including a freshness parameter and a UE context; generate an authentication token based on the freshness parameter and the UE context; and send, to the first network node, a resume response message including the authentication token.

According to another embodiment, a communication system for resuming a connection comprises a UE and network nodes. A first network node comprises at least one processing circuitry configured to prepopulate a UE context, and send, to a second network node, the UE context. The second network node comprises at least one processing circuitry configured to receive, from the first network node, the UE context, and send, to a UE, a resume request message including a freshness parameter and the UE context. The UE comprises at least one processing circuitry configured to receive, from a second network node, a resume request message including the freshness parameter and the UE context; generate an authentication token based on the freshness parameter and the UE context; and send, to the second network node, a resume response message including the authentication token.

Certain aspects of the present disclosure and their embodiments may provide solutions to these or other challenges. There are, proposed herein, various embodiments which address one or more of the issues disclosed herein.

Certain embodiments may provide one or more of the following technical advantages. The methods disclosed in the present disclosure may provide a token in a resume response message to improve the security in the resume procedure and indicate early data transmission. Therefore, the method may recognize the resume request from a legitimate UE based on the token generated by a freshness parameter provided in resume request message, e.g. Msg2 or any other suitable messages. In addition, the method may facilitate the resume procedure by providing a prepopulated UE context from a source network node to a target node. Furthermore, the method may skip a resume complete message attributed to an improved security of the resume response message, e.g. Msg3.

Particular embodiments improve a secure resume procedure by limiting possibility for a successful replay and mitigating effects of replay attempts. Particular embodiments prepopulate UE context for a target network node to speed up the resume procedure. Particular embodiments provide a better resource application by omitting extra transmissions.

Various other features and advantages will become obvious to one of ordinary skill in the art in light of the following detailed description and drawings. Certain embodiments may have none, some, or all of the recited advantages.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
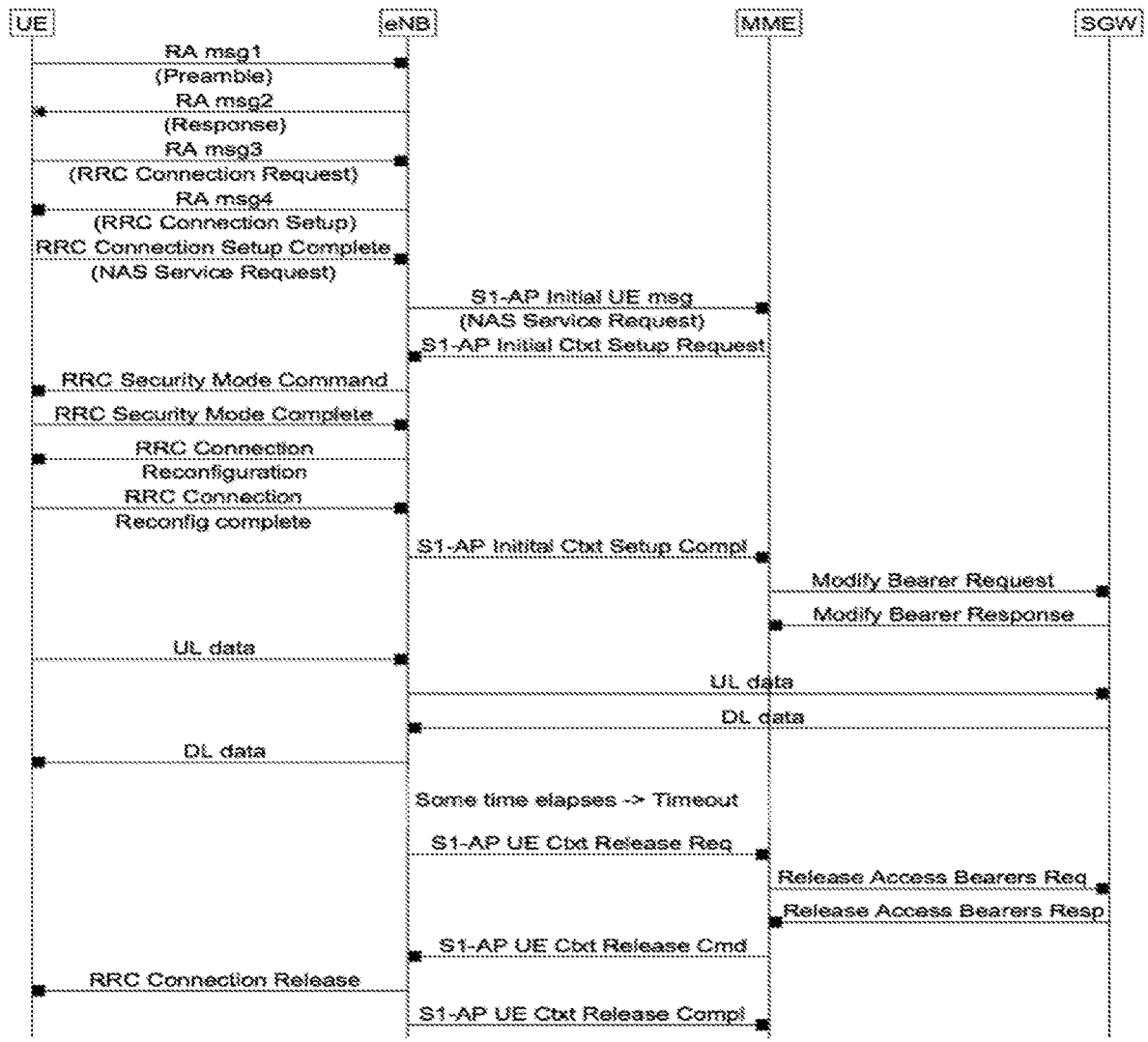
FIG. 1 illustrates an example legacy connection setup procedure.
Figure 2:
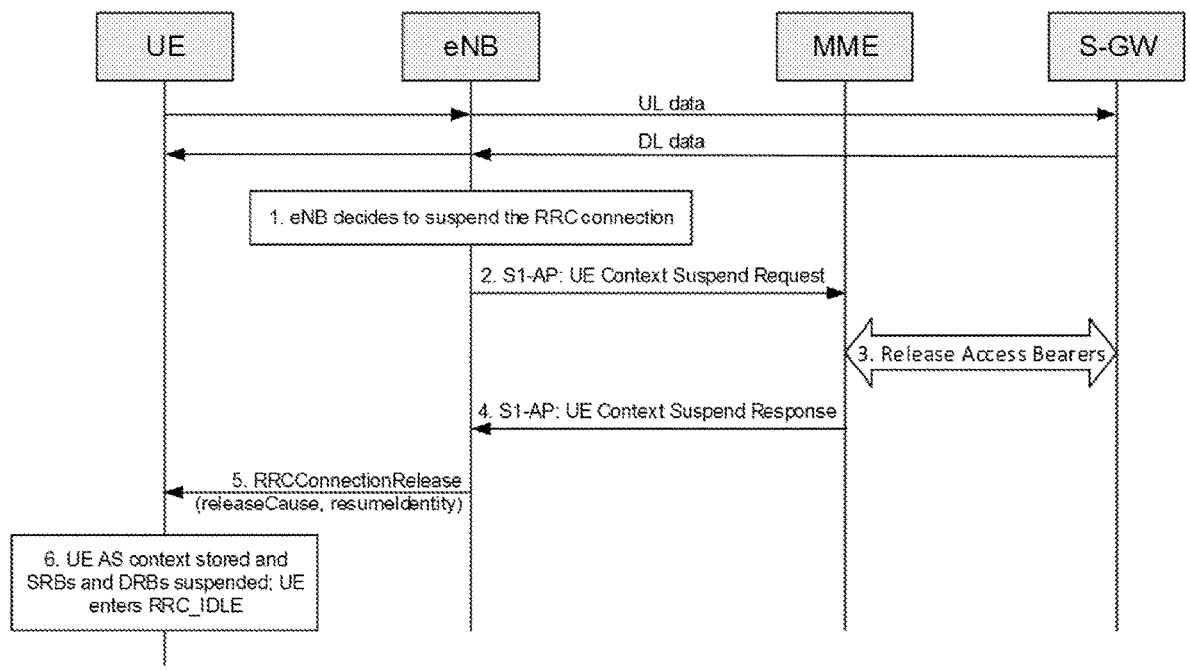
FIG. 2 illustrates an example RRC Connection Suspend procedure.
Figure 3:
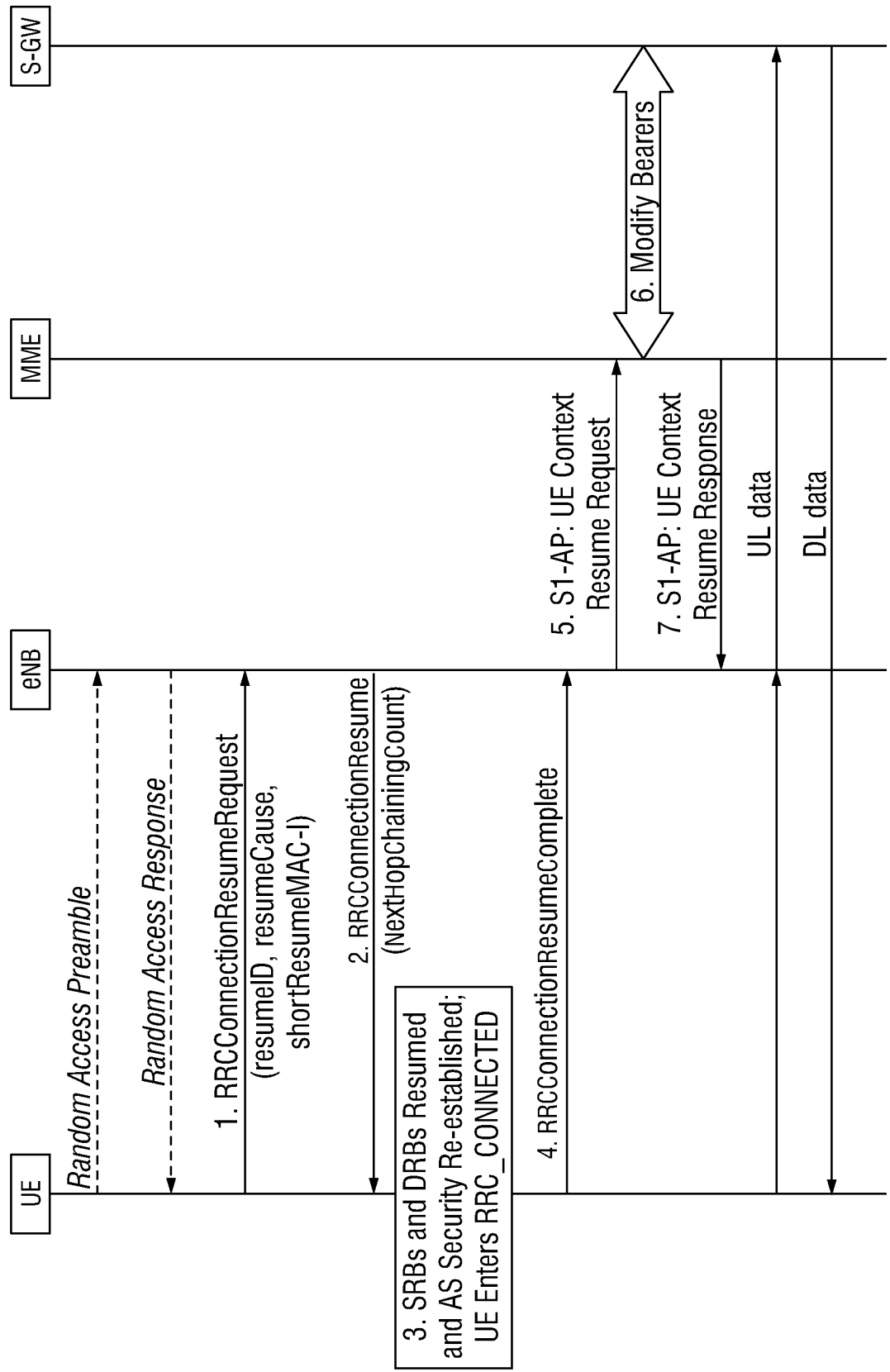
FIG. 3 illustrates an example RRC Connection Resume procedure.
Figure 4:
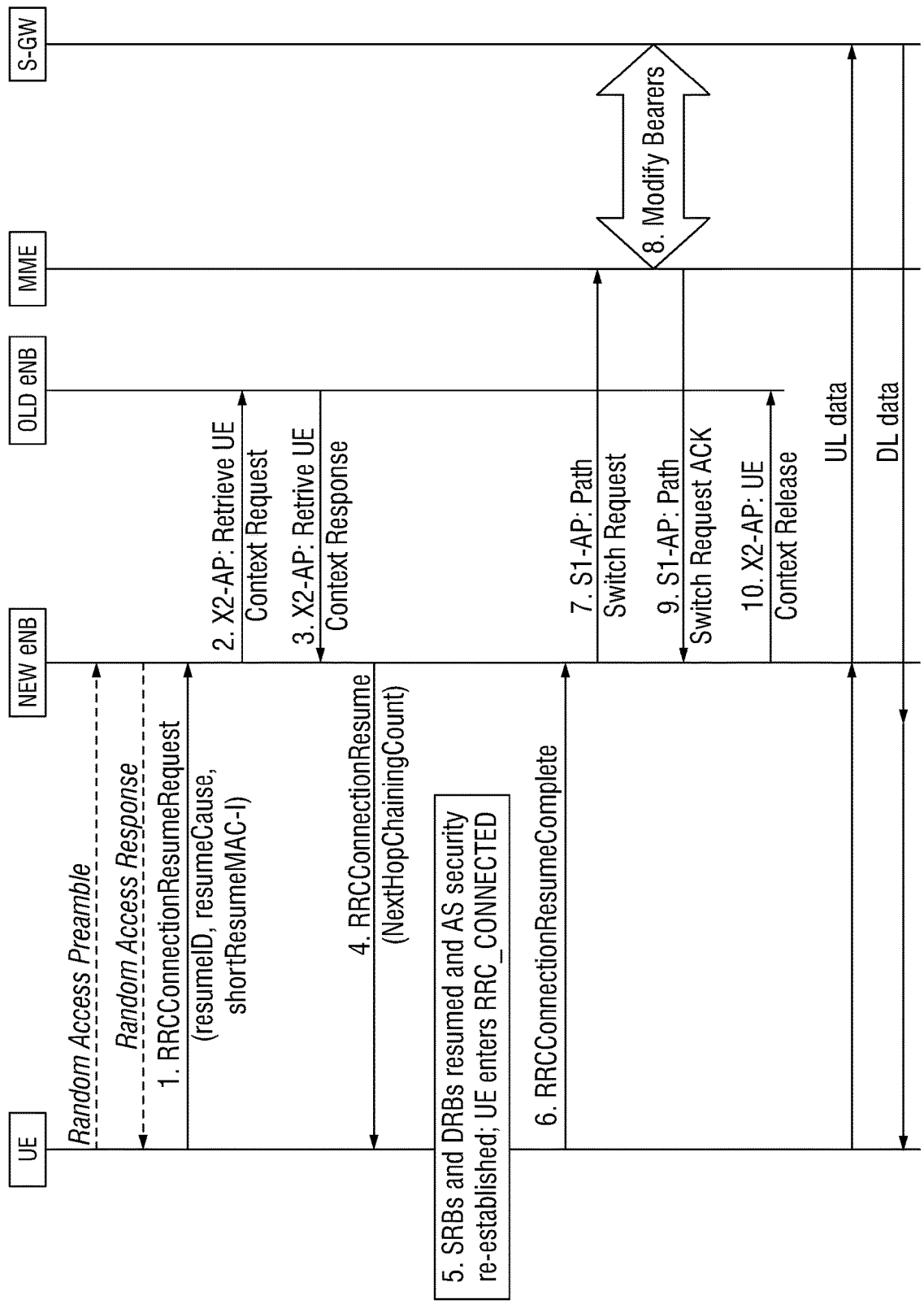
FIG. 4 illustrates an example RRC Connection Resume procedure in different eNBs.
Figure 5:
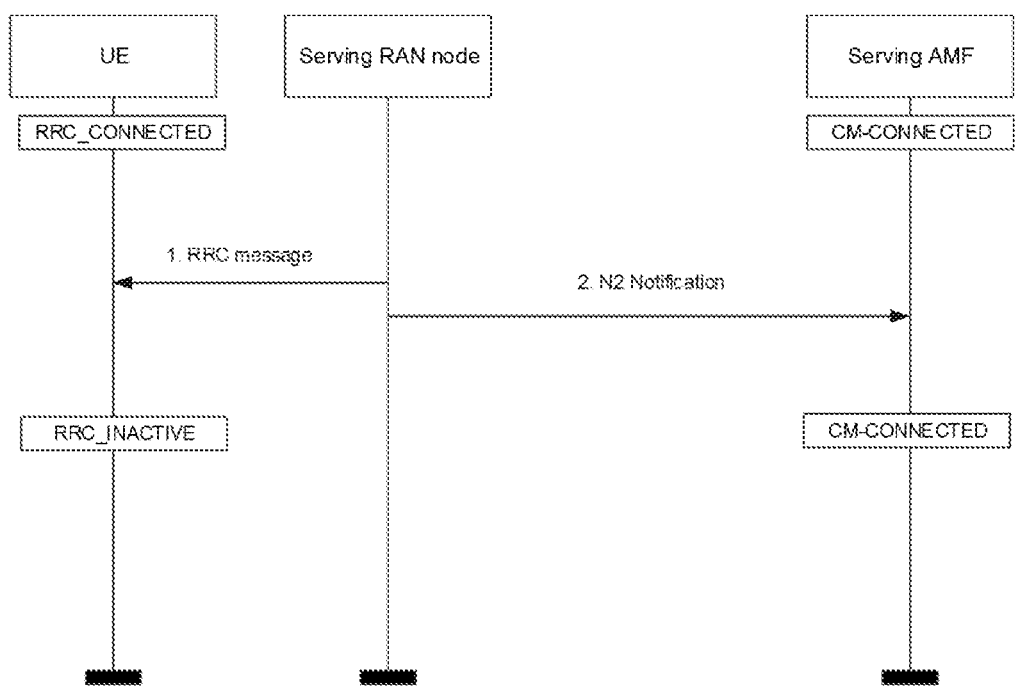
FIG. 5 illustrates an example transition from RRC Connected state to RRC Inactive state.
Figure 6:
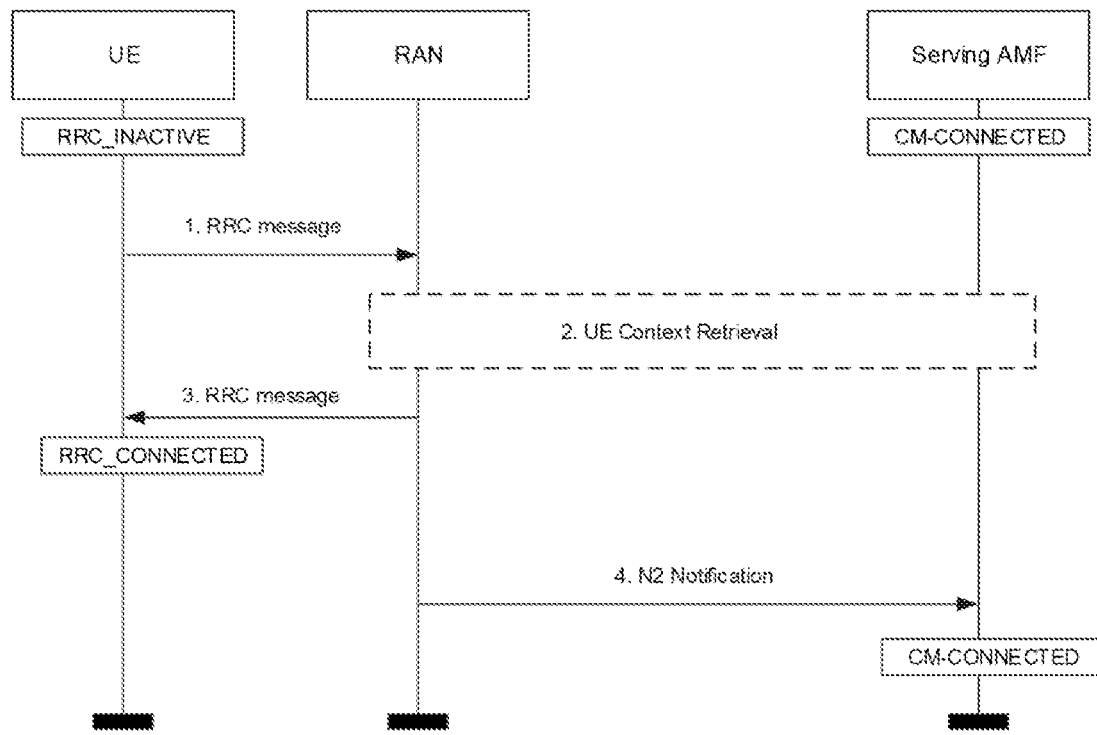
FIG. 6 illustrates an example transition from RRC inactive state to RRC Connected state.
Figure 7:
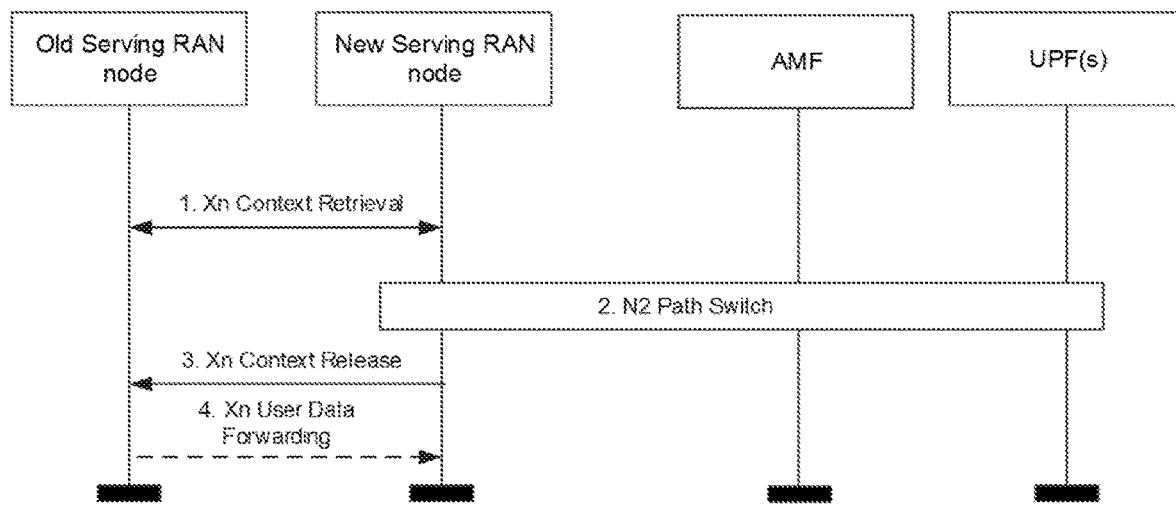
FIG. 7 illustrates an example UE context retrieval via a radio access network.

In RRC connection resume procedure in LTE and NR, a user equipment may be denied reinstating RRC_CONNECTED state for various reasons, such as when the RAN is currently overloaded or when a network node does not recognize the UE. In order to resume a connection in the same cell and to be distinguished from attackers, particular embodiments provide the UE with a freshness parameter and a prepopulated UE context in a random access response (RAR) message. The freshness parameter is used to indicate early data transmission and to generate an authorization token to be used in a resume response message. The network node receives the resume response message with the authorization token and recognizes the legitimate UE. Therefore, a secure resume procedure may be accomplished. The freshness parameter in the present disclosure is calculated afresh in each resume attempt to be distinguished from a replay.

In addition, particular embodiments further provide a prepopulated UE context for a target network node to facilitate the resume procedure. With the freshness parameter and the prepopulated UE context in the random access response message, the network may indicate to the UE not to send a resume complete message after receiving a connection setup message, especially when there is no transmission after the resume response message. Therefore, the security and efficiency of the network are improved due to the authorization token and a saving on the resources. Particular embodiments may use new AS keys in calculation of authentication token or code.

Particular embodiments may be applied to certain scenarios, which include, but are not limited to a scenario when a UE retries to request connection resume after a failed/denied/rejected resume attempt/request, and a scenario when a UE attempts to send UL data in Msg3.

Particular embodiments further support pre-population of UE contexts to speed up the resume procedure. Pre-population means that the node storing the UE context for UEs in suspended or inactive states provide this UE context to other nodes which may be candidate nodes for the UE to resume or become active. In this case, these candidate nodes do not need to waste time fetching the UE context from the original node before setting up the UE connection.

Particular embodiments provide methods to protect against replay attacks on resume procedure after a failed/denied/rejected resume attempt/request; e.g., for transition from an RRC INACTIVE or IDLE state to RRC_CONNECTED state. The methods allow the eNB to earlier detect the replay of resume request, i.e., when processing Msg3, and thus help prevent forwarding faked data received in Msg3 to S-GW in early data transmission.

In some embodiments, the network provides the UE with a new ResumeID with the message signaling failure/denial/rejection of the resume attempt/request. In certain embodiments, the message signaling the failure of the resume request may be an RRCConnectionReject message with suspend indication. In certain embodiments, the new ResumeID may be associated with the source network node if the context is kept in the source node. In some embodiments, the new ResumeID may be associated with the target network node if the context is moved to the target node. In some embodiments, the source network node may refer to the old network node and the target network node may refer to the new network node. The provisioning of the new ResumeID is encrypted and optionally integrity protected, and/or the ResumeID is included in input to the calculation of the MAC-I, ShortResumeMAC-I or corresponding other authentication token or code provided with the resume request.

In some embodiments, a new key derivation may be performed subsequent to the failure of the resume request. The need to derive new key(s) may be determined by a rule in specification. In some embodiments, it may always derive new key(s) when resume request fails. In some embodiments, deriving new key(s) may be indicated with signaling. For example, an indication in a message signaling the failure of the resume request. The indication may comprise a flag or an indicator to perform key derivation, e.g., horizontal key derivation. In some embodiments, the indication may comprise a new NCC parameter. A new NCC parameter may be needed in case NCC is not provided at suspension. For example, when UE may not yet be aware of what type of key derivation may be performed first. In some embodiments, a new NCC parameter may also be needed for the case when NCC was provided at suspension and vertical key derivation may be performed.

In some embodiments, a derivation of new keys after the failure of the resume request may apply globally. For example, the derivation of new keys may be independent of which cell the next resume request is performed, in which case the indication to perform the derivation of new keys is fed back to the source network node storing the context, so that the context may be modified accordingly.

In some embodiments, the derivation of new keys after the failure of the resume request may apply locally. For example, the derivation of new keys may apply in specific cell or area, in which case UE and network node may keep track of which cells require the derivation of new keys, and the target network node may inform the source node when the UE context is requested upon a subsequent resume request.

In some embodiments, the input to the calculation of the MAC-I, ShortResumeMAC-I or corresponding other authentication token or code provided with the resume request may be changed or modified. In some embodiments, the newly assigned C-RNTI may replace the old C-RNTI after the failure of the resume request, and the stored UE context may be updated accordingly in the UE and in the source network node. In some embodiments, ResumeID may be included in the input to the calculation of the MAC-I, ShortResumeMAC-I or corresponding other authentication token or code provided with the resume request. In some embodiments, a new ResumeID may be assigned at the failure of the resume request and the stored UE context may be updated accordingly in the UE and in the source network. In case a new ResumeID may assigned, the UE context may be kept in the source network node or be moved to the target network node.

In some embodiments, a freshness/replay protection may be introduced and achieved by providing a freshness parameter in Msg3/RRCConnectionResumeRequest or Msg4/RRCConnectionResume. In some embodiments, the freshness parameter may be input to the calculation of the MAC-I, ShortResumeMAC-I or corresponding other authentication token or code provided with the resume request/Msg3 and/or the resume message/Msg4, so that the output may be different if the procedure/attempt is repeated/retried. In some embodiments, the freshness parameter may be a counter, a transaction identifier, a time/timing reference or a random value. In certain embodiments, a transaction identifier may be an RRC transaction identifier. In certain embodiments, a time/timing reference may be a frame number or time. In certain embodiments, a frame number may be a radio frame number, a system frame number (SFM), a connection frame number or a session frame number. In certain embodiments, time may be a GNSS based time, UTC or local time. Time may be expressed with a granularity of seconds, milliseconds or microseconds. Furthermore, time may be relative to an epoch, e.g., 00:00:00 UTC on 1 Jan. 1970. In some embodiments, the received freshness parameter may be echoed back to the sender in integrity protected Msg4/RRCConnectionResume or Msg5/RRCConnectionResumeComplete, respectively. In some embodiments, the freshness parameter may be input to calculation of the MAC-I for integrity protected Msg4 or Msg5, respectively, without being explicitly included in the message. In some other embodiments, the freshness parameter may be input to calculation of an authentication token or code which may be included in Msg4 or Msg5 and provided to the sender of Msg3 or Msg4, respectively.

In certain embodiments, the freshness parameter in the case of early data transmission may be the Temporary C-RNTI assigned to the UE in Msg2 or any other suitable messages. This helps improve possibility to detect and/or discern a replay of the resume request received in Msg3 or any other suitable messages at the eNB. As a result, the eNB may, in the case of early data transmission, avoid forwarding possible faked UL data received in Msg3 to the S-GW. Since the network has the possibility to always select a Temporary C-RNTI or similar scheduling identity to a UE which has not been used for a period of time the network can ensure that the Temporary C-RNTI provide freshness to each access attempt preventing or limiting the possibility for replay attacks.

In early data transmission, the method in the present disclosure for calculating ShortResumeMAC-I helps strengthen the security of Msg3, thereby allowing the omission of an RRC complete message, e.g., RRCConnectionResumeComplete in Msg5. Omission of the RRC complete message can be based on indication from the network that the RRC complete message which, for example, is RRCConnectionResumeComplete in Msg5, may be omitted. Omission of the RRC complete message may be useful when the network intends to instruct the UE to leave RRC connected state or go to RRC inactive or idle state, or when limited or no reconfiguration is performed. If requested by the network, the UE may go back to Idle mode without RRC complete message when no more data transmission is expected after receiving Msg4. In certain embodiments, the UE may go back to Idle mode without RRC complete message when RRCConnectionRelease or an RRC message instructing the UE to go to RRC inactive or idle state with stored context is received in response to a request from the UE to resume the RRC connection. The request may be RRCConnectionResumeRequest. This helps further reduce signaling. Alternatively to network indicating to the UE that the RRC complete message, e.g., RRCConnectionResumeComplete, may or shall be omitted, it may be specified that the RRC complete message may be omitted in some specified cases or under certain indicated circumstances. For example, when Msg4 comprises an indication that the RRC may leave RRC Connected state or enter RRC inactive or RRC idle state with or without stored context.

In certain embodiments, the source node (eNB) prepopulates UE contexts in candidate target nodes. The candidate nodes may be decided based on, for example mobility history. Pre-population of UE contexts including AS security context helps speed up the resume procedure since the target nodes will not have to fetch the UE contexts during the resume procedure after receiving Msg3. In another embodiment, to make use of the pre-population, the new AS integrity key may be used for the calculation of shortResumeMAC-I at the UE. This is because the source node is not allowed to send current or old security keys to other nodes and the prepopulated UE contexts are used to derive new AS keys.

Particular embodiments may be performed after a failure of the resume request, and particular embodiments disclosed herein may be performed for a re-establishment of connection.

To limit/mitigate the effect of a replay or replay attempt and preserve the possibility for a legitimate UE to resume the stored context, the target network node may return the stored UE context back to the source network node. In some embodiments, the context provided to the source network node may be an unmodified copy of what was retrieved or updated by one or more of the methods herein. In some embodiments, the return of a context may be triggered by a failure of a resume request, by detection of a replay attempt, and/or by detection of invalid security information, e.g, MAC-I, and/or invalid information/data, e.g., CRC. In some embodiments, the context returned to the source network node may comprise the stored UE context, indication or information indicative of the reason for returning the UE context, the location and/or other identifying information of where it was and/or which entity/node/cell determined the condition to return the UE context, and when it was determined etc. In some embodiments, the source network node may register and store additional information about which node/cell it received the returned UE context from. In some embodiments, the returned context may be stored by the source network node and considered for new context retrieval request thereby preserving the possibility for the legitimate UE to successfully resume from a stored context and avoid an additional signaling and/or DoS. In some embodiments, the source network node may use the information received and any additional information to restrict which new context retrieval requests are accepted.

The network node or UE receiving a message which does not provide valid credentials indicating it may be a replayed message may store information about where (e.g. position) and when (e.g. time/date) the message was receives, what identities was used etc. This information may additionally or alternatively also be provided to other nodes, such as network or radio node, and management node.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE) etc.

Also, in some embodiments, generic terminology "network node" is used. It can be any kind of network node which may comprise of a radio network node such as base station, radio base station, base transceiver station, base station controller, network controller, multi-standard radio BS, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., MME, SON node, a coordinating node, positioning node, MDT node, etc.), or even an external node (e.g., 3rd party node, a node external to the current network), etc. The network node may also comprise a test equipment.

The term "radio node" used herein may be used to denote a UE or a radio network node.

The term "signaling" used herein may comprise any of: high-layer signaling (e.g., via radio resource control (RRC) or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

Regarding naming message and numbering, sometimes messages corresponding to e.g., RRCConnectionResumeRequest, RRCConnectionResume and RRConnectionResumeComplete etc. are referred to in terms of where they occur in a random access sequence. As an example, in LTE, the messages RRCConnectionResumeRequest, RRCConnectionResume and RRConnectionResumeComplete correspond to messages 3, 4 and 5 in a random access procedure. Hence, they are often referred to as Msg3, Msg4 and Msg5, respectively. Same or similar or analogous naming is often used also in the context of NR and may, with or without some adaptations, be used also in the context of other access technologies and/or systems.

Figure 8:
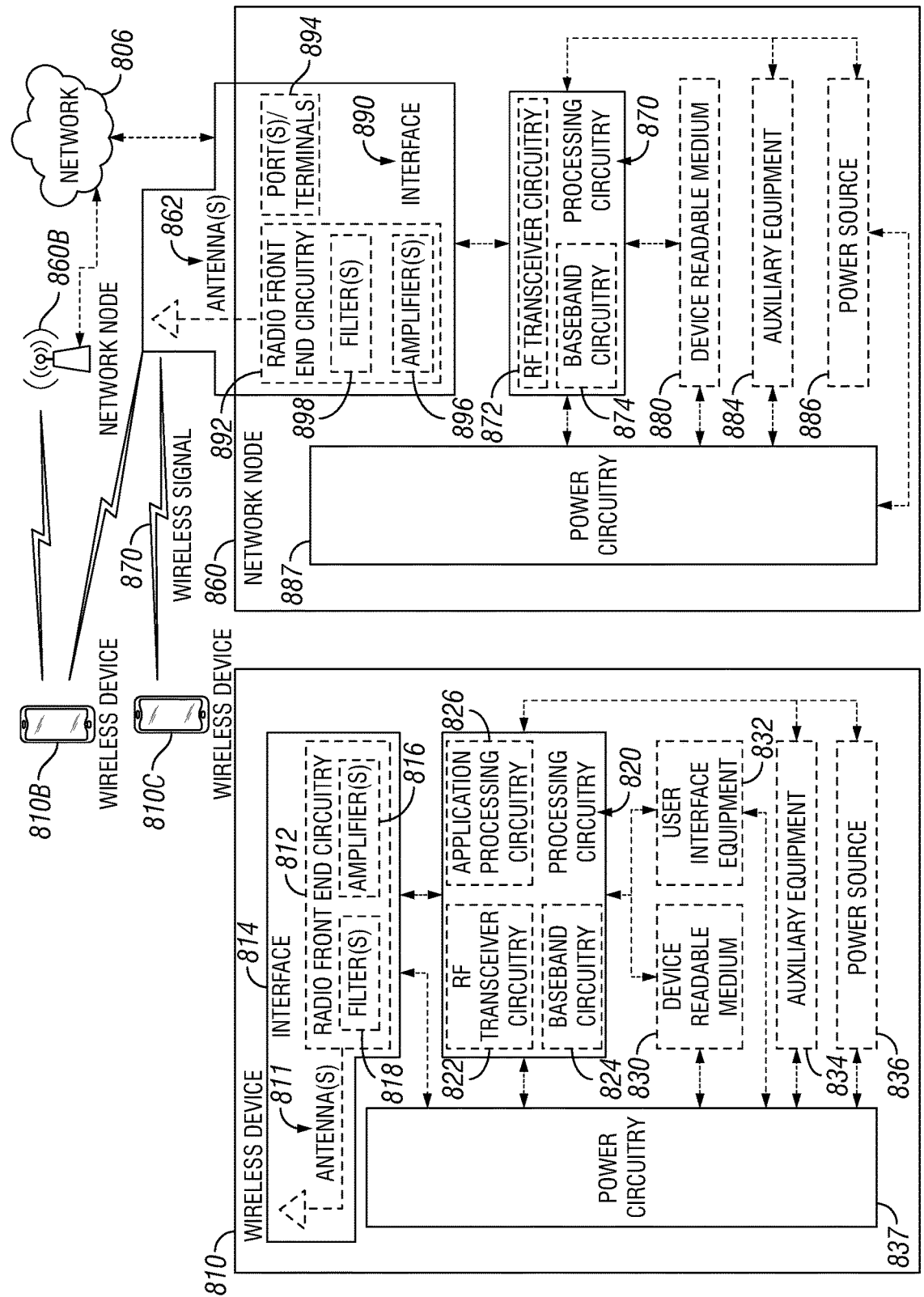
FIG. 8 illustrates an example wireless network, according to certain embodiments.

FIG. 8 is an example wireless network, according to certain embodiments in accordance with certain embodiments. Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860 b, and wireless devices (WDs) 810, 810 b, and 810 c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. In certain embodiments, the network node 860 may be a network node which is further depicted in FIG. 19. In some embodiments, the network node 860 may be a base station which is further depicted in FIGS. 11 to 16. In certain embodiments, the wireless device 810 may be a user equipment, which is further illustrated in FIGS. 9, 11-16, and 20. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 888, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination. In particular embodiments, the processing circuitry 870 of the network node 860 may perform certain methods, such as those illustrated in FIG. 17.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). In certain embodiments, the wireless device 810 may be a user equipment which is further depicted in FIGS. 9, 11-17 and 20. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein. In particular embodiments, the processing circuitry 820 of the wireless device 810 may perform the method which is further illustrated in FIG. 18.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionalities described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
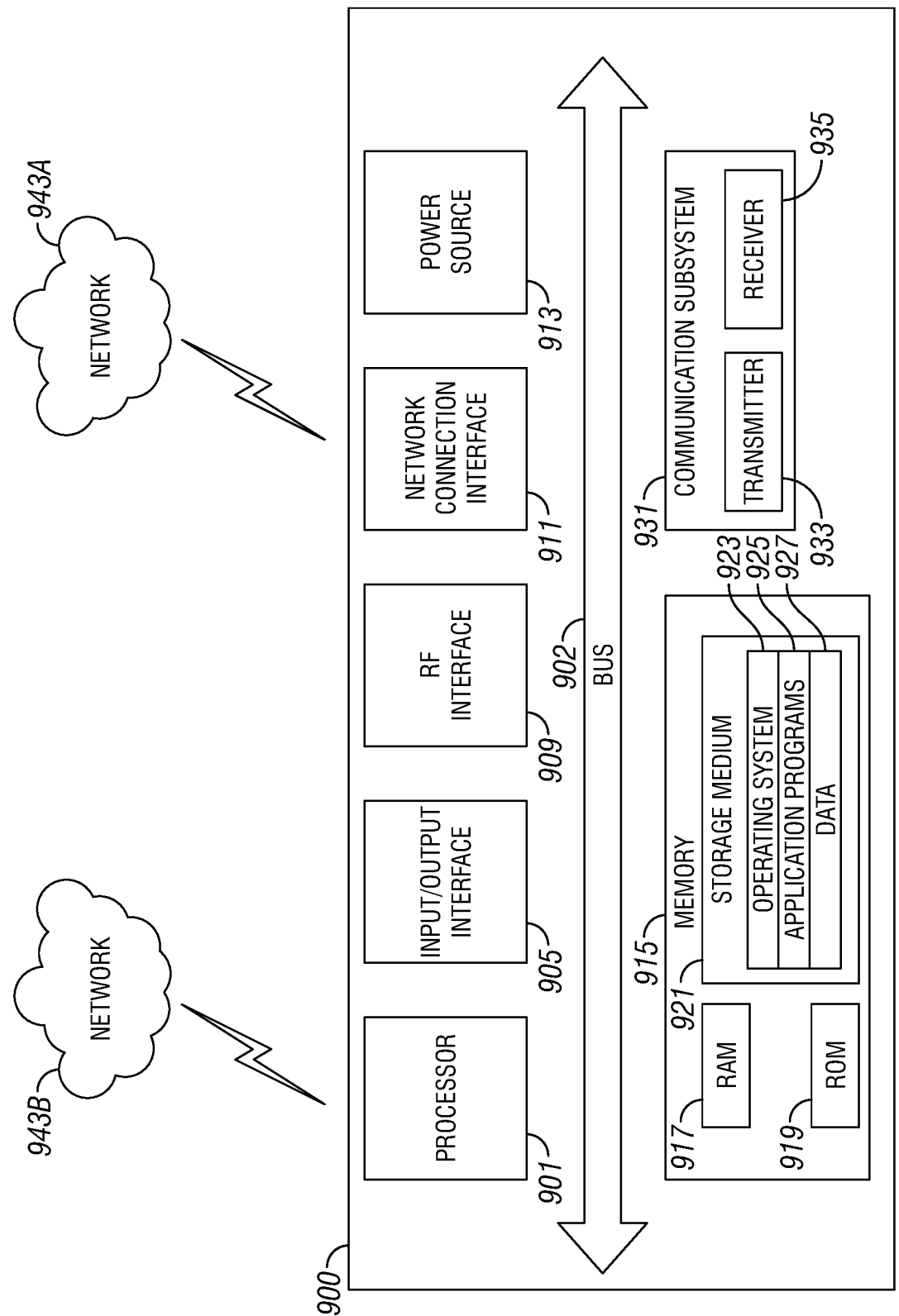
FIG. 9 illustrates an example user equipment, according to certain embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the 3rd Generation Partnership Project (3GPP), including a NB-IoT UE, a MTC UE, and/or an enhanced MTC (eMTC) UE. UE 900, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. In certain embodiments, the user equipment 900 may be a user equipment which is further depicted in FIG. 20. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943 a. Network 943 a may encompass wired and/or wireless networks such as a local-area network (LAN), a wide-area network (WAN), a computer network, a wireless network, a telecommunications network, another like network or any combination thereof. For example, network 943 a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943 b using communication subsystem 931. Network 943 a and network 943 b may be the same network or networks or different network or networks. Communication subsystem 931 may be configured to include one or more transceivers used to communicate with network 943 b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943 b may encompass wired and/or wireless networks such as a local-area network (LAN), a wide-area network (WAN), a computer network, a wireless network, a telecommunications network, another like network or any combination thereof. For example, network 943 b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
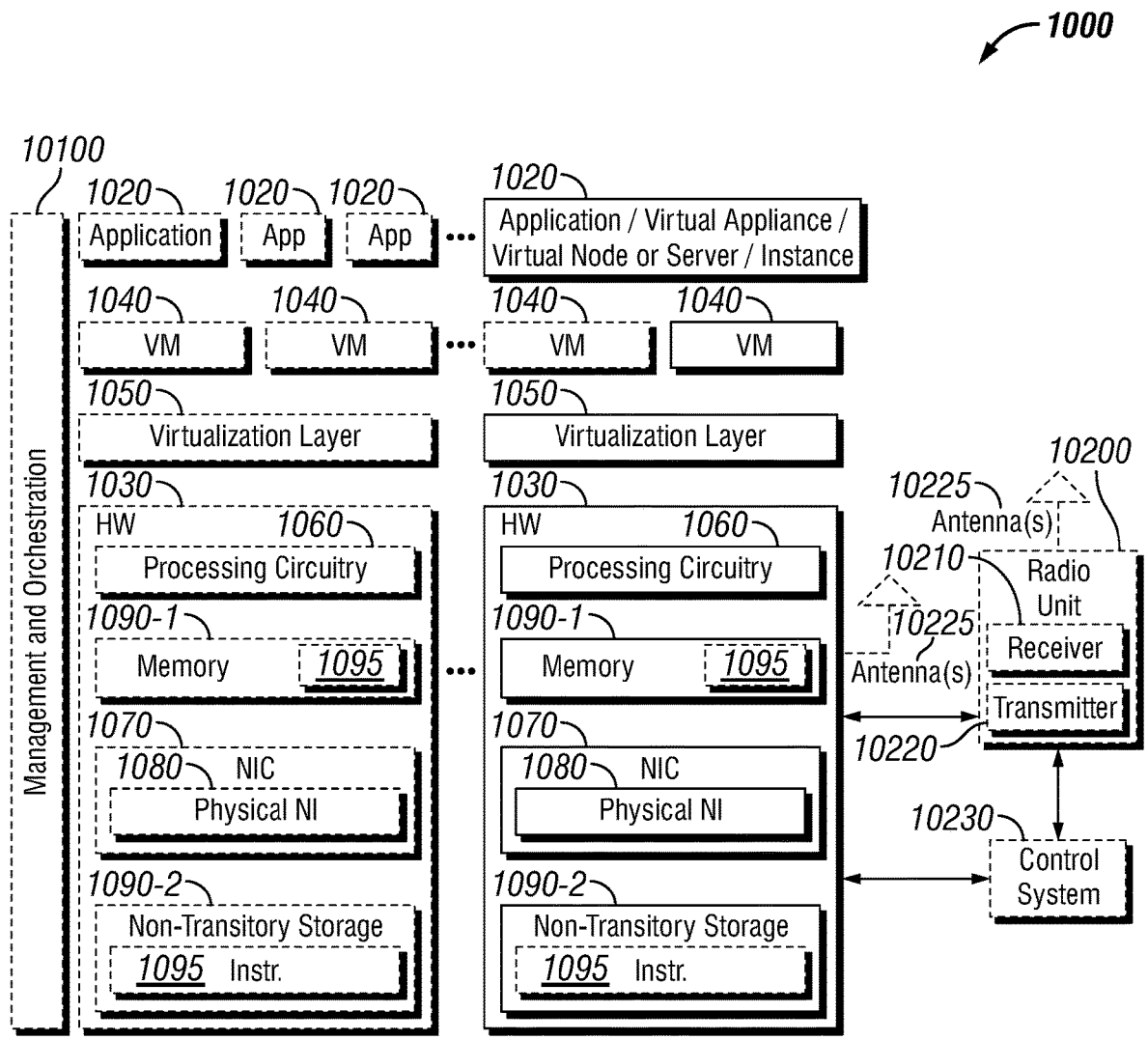
FIG. 10 illustrates an example virtualization environment, according to certain embodiments.

FIG. 10 illustrates an example virtualization environment, according to certain embodiments. FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be affected with the use of control system 10230 which may alternatively be used for communication between the hardware nodes 1030 and radio units 10200.

Figure 11:
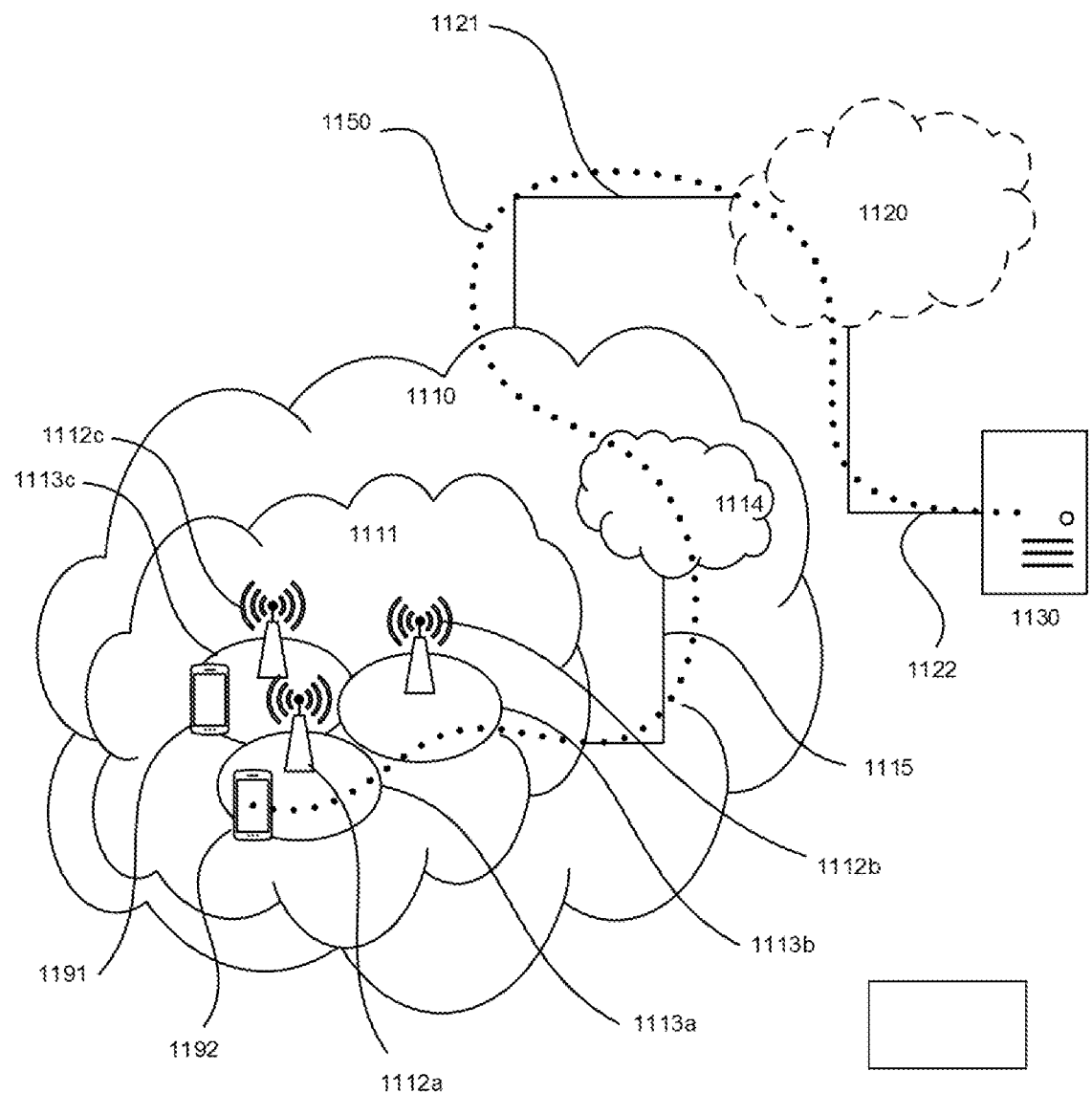
FIG. 11 illustrates an example telecommunication network connected via an intermediate network to a host computer, according to certain embodiments.

FIG. 11 illustrates an example telecommunication network connected via an intermediate network to a host computer, according to certain embodiments. With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112 $a$, 1112 $b$, 1112 $c$, such as NBs, eNBs, gNBs or other types of wireless access points, each defining a corresponding coverage area 1113 $a$, 1113 $b$, 1113 $c$. In certain embodiments, the plurality of base stations 1112 $a$, 1112 $b$, 1112 $c$ may be the network node as described with respect to FIG. 19. Each base station 1112 $a$, 1112 $b$, 1112 $c$ is connectable to core network 1114 over a wired or wireless connection 1115. A first UE 1191 located in coverage area 1113 $c$ is configured to wirelessly connect to, or be paged by, the corresponding base station 1112 $c$. A second UE 1192 in coverage area 1113 $a$ is wirelessly connectable to the corresponding base station 1112 $a$. While a plurality of UEs 1191, 1192 are illustrated in this example, the disclosed embodiments are equally applicable to a situation where a sole UE is in the coverage area or where a sole UE is connecting to the corresponding base station 1112. In certain embodiments, the plurality of UEs 1191, 1192 may be the user equipment as described with respect to FIG. 20.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Figure 12:
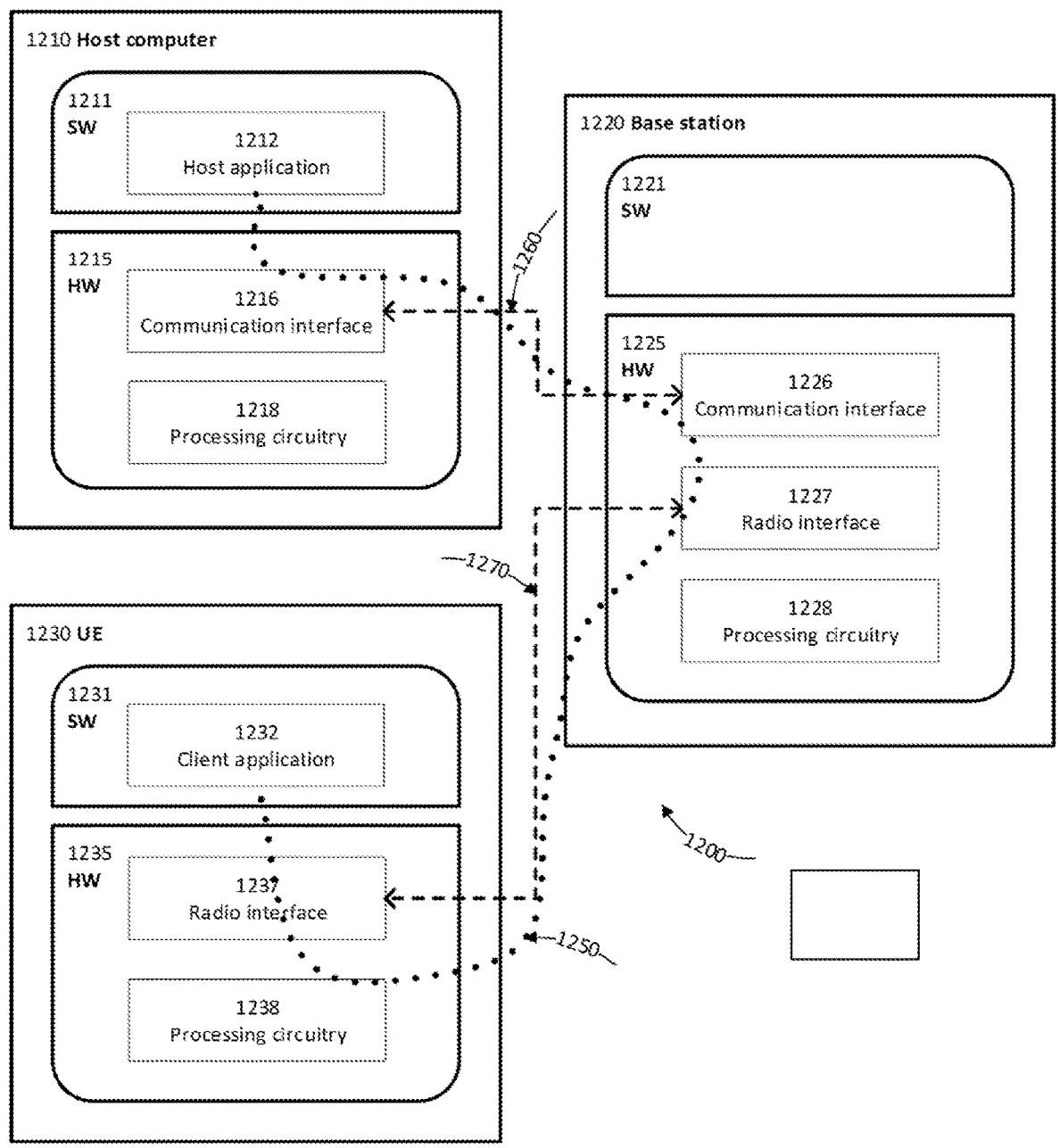
FIG. 12 illustrates an example host computer communicating via a base station with a user equipment over a partially wireless connection, according to certain embodiments.

FIG. 12 illustrates an example host computer communicating via a base station with a user equipment over a partially wireless connection, in accordance with some embodiments. Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. In certain embodiments, the base station 1220 may be the network node as described with respect to FIG. 19. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. In certain embodiments, the UE 1230 may be the user equipment as described with respect to FIGS. 13-15 and 20. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

It is noted that host computer 1210, base station 1220 and UE 1230 illustrated in FIG. 12 may be similar or identical to host computer 1130, one of base stations 1112 *a*, 1112 *b*, 1112 *c* and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the handling of redundant data in the transmit buffer and thereby provide benefits such as improved efficiency in radio resource use (e.g., not transmitting redundant data) as well as reduced delay in receiving new data (e.g., by removing redundant data in the buffer, new data can be transmitted sooner).

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
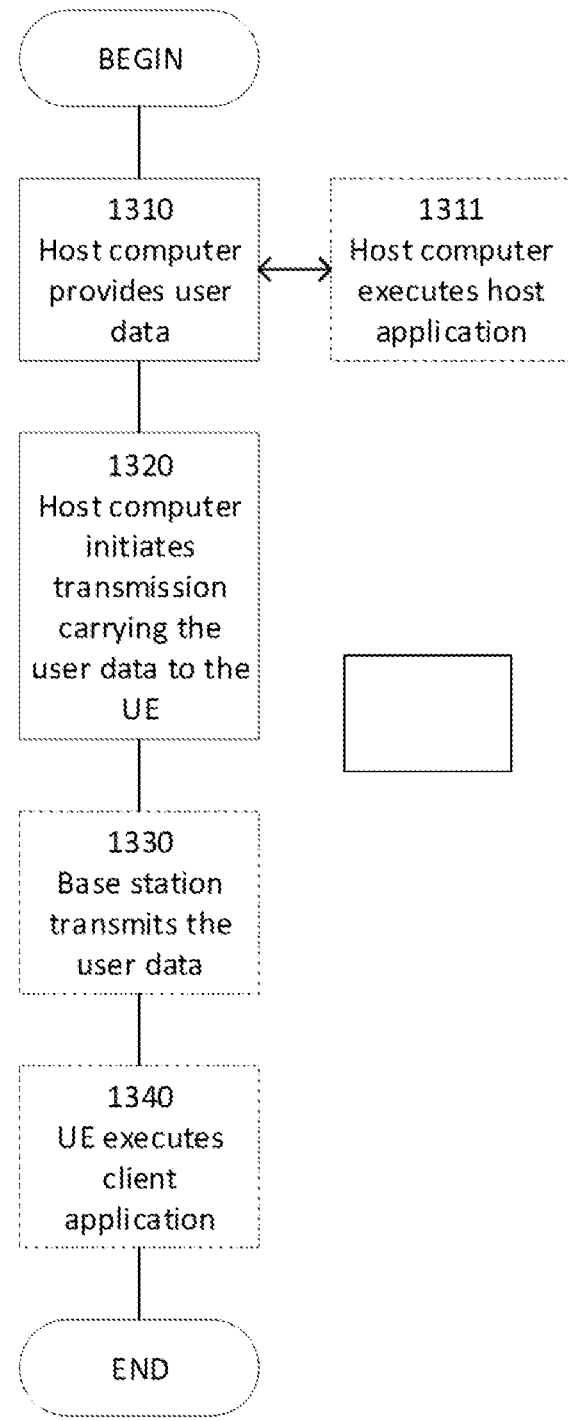
FIG. 13 illustrates an example method implemented in a communication system including a host computer, a base station and a user equipment, according to certain embodiments.

FIG. 13 illustrates an example method implemented in a communication system including a host computer, a base station and a user equipment, according to certain embodiments in accordance with some embodiments. More specifically, FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
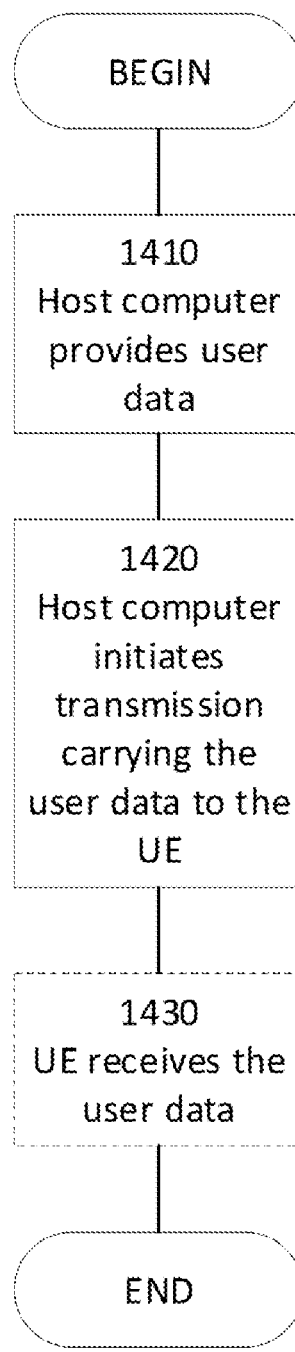
FIG. 14 illustrates another example method implemented in a communication system including a host computer, a base station and a user equipment, according to certain embodiments.

FIG. 14 illustrates an example method implemented in a communication system including a host computer, a base station and a user equipment, in accordance with some embodiments. More specifically, FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
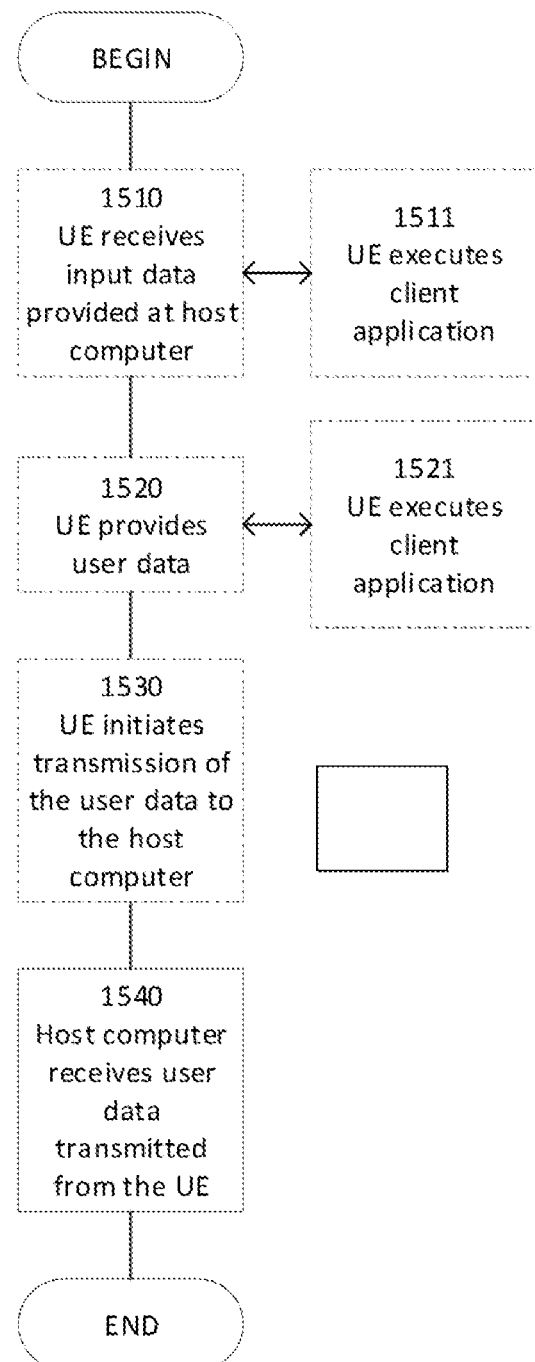
FIG. 15 illustrates another further example method implemented in a communication system including a host computer, a base station and a user equipment, according to certain embodiments.

FIG. 15 illustrates another further example method implemented in a communication system including a host computer, a base station and a user equipment, in accordance with some embodiments. More specifically, FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
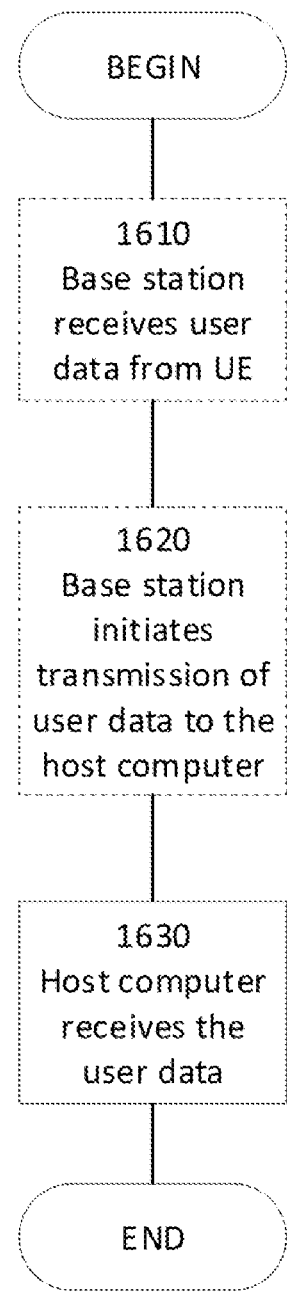
FIG. 16 illustrates another yet example method implemented in a communication system including a host computer, a base station and a user equipment, according to certain embodiments.

FIG. 16 illustrates another example method implemented in a communication system including a host computer, a base station and a user equipment, in accordance with some embodiments. More specifically, FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 17:
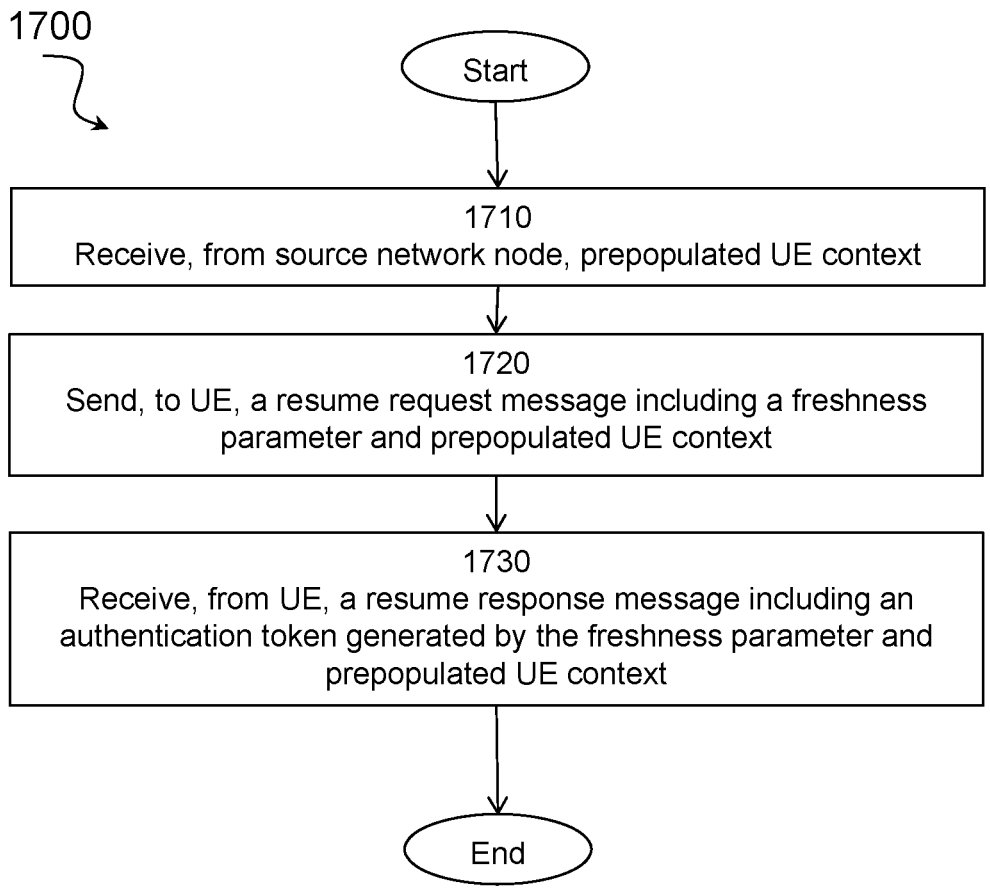
FIG. 17 illustrates a flow diagram of an example method in a network node, in accordance with certain embodiments.

FIG. 17 is a flow diagram of an example method in a network node, in accordance with certain embodiments. Method 1700 begins at step 1710 with a second network node receiving, from a first network node, a user equipment (UE) context prepopulated by the first network node. In certain embodiments, the first network node may be a source network node. In certain embodiments, the second network node may be a target network node. In some embodiments, the first network node and the second network node may be the network node 860 shown in FIG. 8. In some embodiments, the first network node and the second network node may be the base station shown in FIGS. 11 and 12. In certain embodiments, the UE context may comprise access stratum (AS) integrity key. In certain embodiments, the AS integrity key may be generated based on Next Hop Chaining Count (NCC) value.

At step 1720, the second network node sends, to a UE, a resume request message including a freshness parameter and the UE context. In some embodiments, the UE may be the wireless device 810 depicted in FIG. 8. In some embodiments, the user equipment may be the user equipment 900 shown in FIG. 9. In certain embodiments, the freshness parameter may be used to indicate early data transmission. In certain embodiments, the freshness parameter may be a temporary cell radio network temporary identifier (C-RNTI).

At step 1730, the second network node receives, from the UE, a resume response message including an authentication token generated by the freshness parameter and the UE context. In certain embodiments, the authentication token may be shortResumeMAC-1. In certain embodiments, the second network node may further send, to the UE, a connection setup message including an omission indication. The omission indication may instruct the UE not to send a complete message when there is no data transmission after the resume response message.

Figure 18:
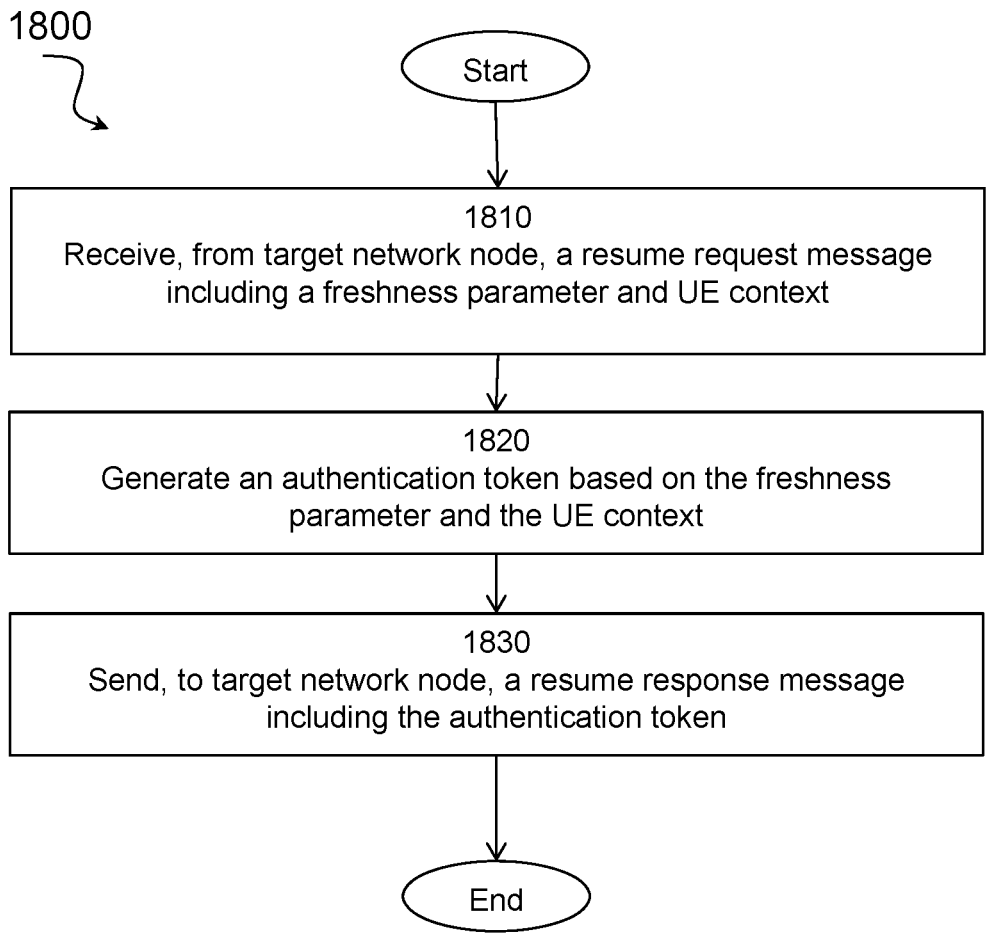
FIG. 18 illustrates a flow diagram of an example method in a user equipment, in accordance with certain embodiments.

FIG. 18 is a flow diagram of an example method performed at a user equipment, in accordance with certain embodiments. Method 1800 begins at step 1810 with a user equipment receiving, from a first network node, a resume request message including a freshness parameter and a UE context. In certain embodiments, the UE context may comprise access stratum (AS) integrity key. In certain embodiments, the AS integrity key may be generated based on Next Hop Chaining Count (NCC) value. In certain embodiments, the UE context may be prepopulated by a second network node and sent from the second network node to the first network node. In some embodiments, the UE may be the wireless device 810 depicted in FIG. 8. In some embodiments, the user equipment may be the user equipment 900 shown in FIG. 9. In certain embodiments, the freshness parameter may be used to indicate early data transmission. In certain embodiments, the freshness parameters may be used to indicate early data transmission. In certain embodiments, the freshness parameter may be a temporary cell radio network temporary identifier (C-RNTI). In certain embodiments, the first network node may be a target network node. In certain embodiments, the second network node may be a source network node. In some embodiments, the first network node and the second network node may be the network node 860 shown in FIG. 8. In some embodiments, the first network node and the second network node may be the base station shown in FIGS. 11 and 12.

At step 1820, the UE generates an authentication token based on the freshness parameter and the UE context. In certain embodiments, the authentication token may be shortResumeMAC-1.

At step 1830, the UE sends, to the first network node, a resume response message including the authentication token. In certain embodiments, the UE may further receive from the first network node a connection setup message including an omission indication. The omission indication may instruct the UE not to send a complete message when there is no data transmission after the resume response message.

Figure 19:
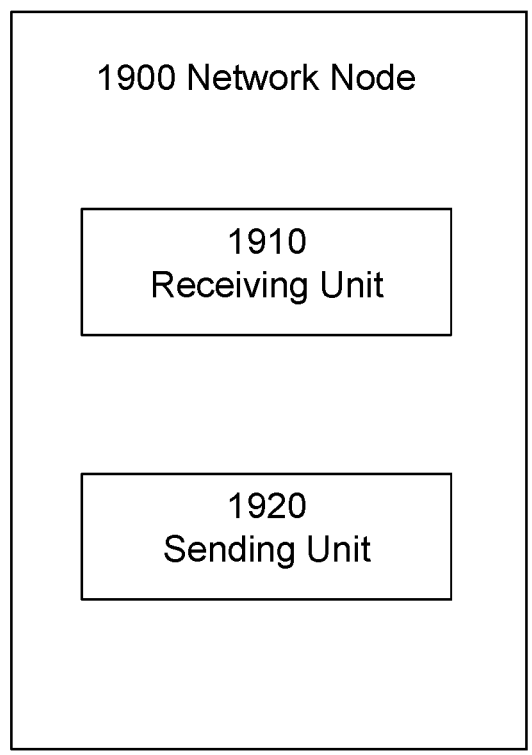
FIG. 19 illustrates a block schematic of an example network node, in accordance with certain embodiments.

FIG. 19 is a schematic block diagram of an example network node, in accordance with certain embodiments. The network node 1900 may be used in may be used in a wireless network (for example, the wireless network 860 shown in FIG. 8). The network node 1900 may be implemented in a wireless device (e.g., wireless device 810 shown in FIG. 8). The network node 1900 is operable to carry out the example method described with reference to FIG. 17 and possibly any other processes or methods disclosed herein. It is also to be understood that the method of FIG. 17 is not necessarily carried out solely by the network node 1900. At least some operations of the method can be performed by one or more other entities.

Network node 1900 may comprise processing circuitry, which may include one or more microprocessor or microcontrollers, as well as other digital hardware, which may include digital signal processors (DSPs), special-purpose digital logic, and the like. In some embodiments, the processing circuitry of the network node 1900 may be the processing circuitry 870 shown in FIG. 8. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1910, sending unit 1920, and any other suitable units of network node 1900 to perform corresponding functions according one or more embodiments of the present disclosure, such as a receiver and a transmitter.

As illustrated in FIG. 19, network node 1900 includes receiving unit 1910 and sending unit 1920. Receiving unit 1910 may be configured to receive, from a first network node, a user equipment (UE) context prepopulated by the first network node. In certain embodiments, the first network node may be a source network node and the network node receiving the prepopulated UE context may be a target network node. In certain embodiments, the UE context may comprise access stratum (AS) integrity key. In certain embodiments, the AS integrity key may be generated based on Next Hop Chaining Count (NCC) value.

Sending unit 1920 sends a resume request message including a freshness parameter and the UE context to a UE.

In certain embodiments, the freshness parameter may be used to indicate early data transmission. In certain embodiments, the freshness parameter may be a temporary cell radio network temporary identifier (C-RNTI).

Receiving unit 1910 further receives, from the UE, a resume response message including an authentication token generated by the freshness parameter and the UE context. In certain embodiments, the authentication token may be shortResumeMAC-1. In certain embodiments, the sending unit 1920 may further send, to the UE, a connection setup message including an omission indication. The omission indication may instruct the UE not to send a complete message when there is no data transmission after the resume response message.

Figure 20:
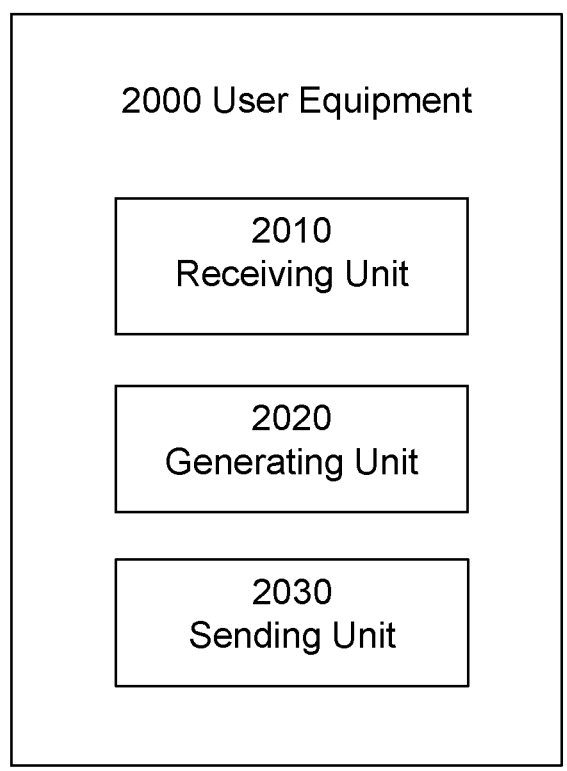
FIG. 20 illustrates a block schematic of an example user equipment, in accordance with certain embodiments.

FIG. 20 is a schematic block diagram of an example user equipment, in accordance with certain embodiments. The user equipment 2000 may be used in a wireless network (for example, the wireless network 810 shown in FIG. 8). The user equipment 2000 may be implemented in a wireless device or network node (e.g., wireless device 810 or network node 860 shown in FIG. 8). User equipment 2000 is operable to carry out the example method described with reference to FIG. 18 and possibly any other processes or methods disclosed herein. It is also to be understood that the method of FIG. 18 is not necessarily carried out solely by user equipment 2000. At least some operations of the method can be performed by one or more other entities.

User equipment 2000 may comprise processing circuitry, which may include one or more microprocessor or microcontrollers, as well as other digital hardware, which may include digital signal processors (DSPs), special-purpose digital logic, and the like. In some embodiments, the processing circuitry of user equipment 1900 may be the processing circuitry 820 shown in FIG. 8. In some embodiments, the processing circuitry of user equipment 2000 may be the processor 901 shown in FIG. 9. The processing circuitry may be configured to execute program code stored in memory 915 shown in FIG. 9, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2010, generating unit 2020, and sending unit 2030, and any other suitable units of user equipment 2000 to perform corresponding functions according one or more embodiments of the present disclosure, such as a transmitter and a receiver.

As illustrated in FIG. 20, user equipment 2000 includes receiving unit 2010, generating unit 2020, and sending unit 2030. The receiving unit 2010 may be configured to receive, from a first network node, a resume request message including a freshness parameter and a UE context. In certain embodiments, the UE context may comprise access stratum (AS) integrity key. In certain embodiments, the AS integrity key may be generated based on Next Hop Chaining Count (NCC) value. In certain embodiments, the UE context may be prepopulated by a second network node and sent from the second network node to the first network node. In certain embodiments, the freshness parameter may be used to indicate early data transmission. In certain embodiments, the freshness parameters may be used to indicate early data transmission. In certain embodiments, the freshness parameter may be a temporary cell radio network temporary identifier (C-RNTI). In certain embodiments, the first network node may be a target network node. In certain embodiments, the second network node may be a source network node.

Generating unit 2020 generates an authentication token based on the freshness parameter and the UE context. In certain embodiments, the authentication token may be shortResumeMAC-1.

Sending unit 2030 sends, to the first network node, a resume response message including the authentication token. In certain embodiments, the receiving unit 2010 may further receive from the first network node a connection setup message including an omission indication. The omission indication may instruct the UE not to send a complete message when there is no data transmission after the resume response message.

The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

According to various embodiments, an advantage of features herein is that providing a protection for both of the UE and the network node to resume a connection. The freshness parameter is provided in random access response message and is used to generate an authorization token which is provided in resume response message. Therefore, the target network node which receives the resume response message with the authorization token may secure that this resume request is sent by a legitimate UE, and thus the network is protected from replay attacks. A connection complete message may be omitted because of the improvement of security in resume procedure, and thus reduce extra transmission.

Particular embodiments provide the freshness parameter to indicate early data transmission and allow for the early detection of replayed resume request, and thus helps the network node to avoid forwarding faked data received in resume response message (Msg3) to network (S-GW) in early data transmission. Another advantage is that a prepopulated UE context provided by a source network node to the target network node facilitates the resume procedure.

While processes in the figures may show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for resuming a connection performed at a network node comprising:
   receiving, from a first network node, at a second network node, a user equipment (UE) context prepopulated by the first network node;
   sending, from the second network node to a UE, a resume request message including a freshness parameter and the UE context;

receiving, from the UE, at the second network node, a resume response message including an authentication token generated based on the freshness parameter and the UE context; and sending, from the second network node to the UE, a connection setup message including an omission indication which instructs the UE to skip to send a resume complete message when there is no data transmission after the resume response message.

2. The method according to claim 1, wherein the UE context comprises an access stratum (AS) integrity key.

3. The method according to claim 1, wherein the freshness parameter is a temporary cell radio network temporary identifier (C-RNTI).

4. The method according to claim 1, wherein the authentication token is shortResumeMAC-1.

5. The method according to claim 1, wherein the freshness parameter is one of a radio frame number, a system frame number (SFM), a connection frame number, or a session frame number.

6. The method according to claim 1, wherein the freshness parameter may be echoed back to the second network node in the resume response message.

7. A method for resuming a connection performed at a user equipment (UE) comprising:
receiving, from a first network node, at the UE, a resume request message including a freshness parameter and a UE context;
generating, at the UE, an authentication token based on the freshness parameter and the UE context;
sending, to the first network node, a resume response message including the authentication token; and
receiving, from the first network node at the UE, a connection setup message including an omission indication which instructs the UE to skip to send a resume complete message when there is no data transmission after the resume response message.

8. The method according to claim 7, wherein the freshness parameter is used to indicate early data transmission.

9. The method according to claim 7, wherein the UE context comprises an access stratum (AS) integrity key.

10. The method according to claim 7, wherein the freshness parameter is a temporary cell radio network temporary identifier (C-RNTI).

11. The method according to claim 7, wherein the authentication token is shortResumeMAC-1.

12. A network node for resuming a connection, comprising:
at least one processing circuitry; and
at least one storage that stores processor-executable instructions, when executed by the processing circuitry, causes the network node to:
receive, from a first network node, a user equipment (UE) context prepopulated by the first network node;
send, to a UE, a resume request message including a freshness parameter and the UE context;
receive, from the UE, a resume response message including an authentication token generated based on the freshness parameter and the UE context; and
send, to the UE, a connection setup message including an omission indication which instructs the UE to skip to send a resume complete message when there is no data transmission after the resume response message.

13. The network node according to claim 12, wherein the UE context comprises an access stratum (AS) integrity key.

14. The network node according to claim 12, wherein the freshness parameter is a temporary cell radio network temporary identifier (C-RNTI).

15. The network node according to claim 12, wherein the authentication token is shortResumeMAC-1.

16. A user equipment (UE) for resuming a connection, comprising:
at least one processing circuitry; and
at least one storage that stores processor-executable instructions, when executed by the processing circuitry, causes the UE to:
receive, from a first network node, a resume request message including a freshness parameter and a UE context;
generate an authentication token based on the freshness parameter and the UE context;
send, to the first network node, a resume response message including the authentication token; and
receive, from the first network node, a connection setup message including an omission indication which instructs the UE to skip to send a resume complete message when there is no data transmission after the resume response message.

17. The user equipment according to claim 16, wherein the freshness parameter is used to indicate early data transmission.

18. The user equipment according to claim 16, wherein the UE context comprises access stratum (AS) integrity key.

19. The user equipment according to claim 16, wherein the freshness parameter is a temporary cell radio network temporary identifier (C-RNTI).

20. The user equipment according to claim 16, wherein the authentication token is shortResumeMAC-1.

* * * * *